United States Patent [19]

Aikawa et al.

[11] 4,383,137
[45] May 10, 1983

[54] KEY TELEPHONE SYSTEM WITH MULTIPLE PROCESSOR CONTROL

[75] Inventors: Chuta Aikawa, Takaidohigashi; Noriyoshi Sanada, Kawagoe; Mitsuyoshi Murakami, Shiraoka; Junzo Kikuchi, Kawasaki; Masaki Kuroda, Yokohama, all of Japan

[73] Assignee: Tamura Electric Works, Ltd., Tokyo, Japan

[21] Appl. No.: 162,568

[22] Filed: Jun. 24, 1980

[30] Foreign Application Priority Data

Jul. 3, 1979 [JP] Japan .................. 54-83485

[51] Int. Cl.³ .................. H04M 1/27; H04Q 3/54
[52] U.S. Cl. .................. 179/18 ES; 179/99 R
[58] Field of Search .................. 179/99 R, 99 M, 18 J, 179/18 AD, 18 ES, 18 FG

[56] References Cited

U.S. PATENT DOCUMENTS

| | | | |
|---|---|---|---|
| 3,604,857 | 9/1971 | Opferman | 179/99 M |
| 3,872,261 | 3/1975 | Shinoi et al. | 179/99 R |
| 3,973,085 | 8/1976 | Shiff | 179/99 M |
| 4,092,501 | 5/1978 | Suzuki et al. | 179/99 M |
| 4,154,988 | 5/1979 | Fechalos et al. | 179/18 B |
| 4,196,316 | 4/1980 | McEowen et al. | 179/18 ES |

Primary Examiner—Thomas W. Brown
Attorney, Agent, or Firm—Townsend and Townsend

[57] ABSTRACT

A key telephone exchange system comprises office line units connected to office lines, terminal units respectively connected to key telephone sets and a main control unit for changing connections between respective office line units and respective terminal units. Each office line unit comprises a first memory device to store data transmitted between the office line unit and an office line, and a first processor for writing and reading data into and out of the first memory device for controlling origination and call requests to and from the office line. Each terminal unit comprises a second memory device adapted to store data transmitted between a terminal unit and a key telephone set, and a second processor for writing and reading data into and out of the second memory device for controlling transmission of data between a terminal unit and a corresponding key telephone set. The main control unit comprises a third memory device for storing states of use of the terminal unit and of the office line unit, and a third processor which sequentially scans data in the first and second memory devices of the terminal unit and of the office line unit and for exchanging connections between the terminal units and the office line units according to data obtained as a result of the scanning.

28 Claims, 23 Drawing Figures

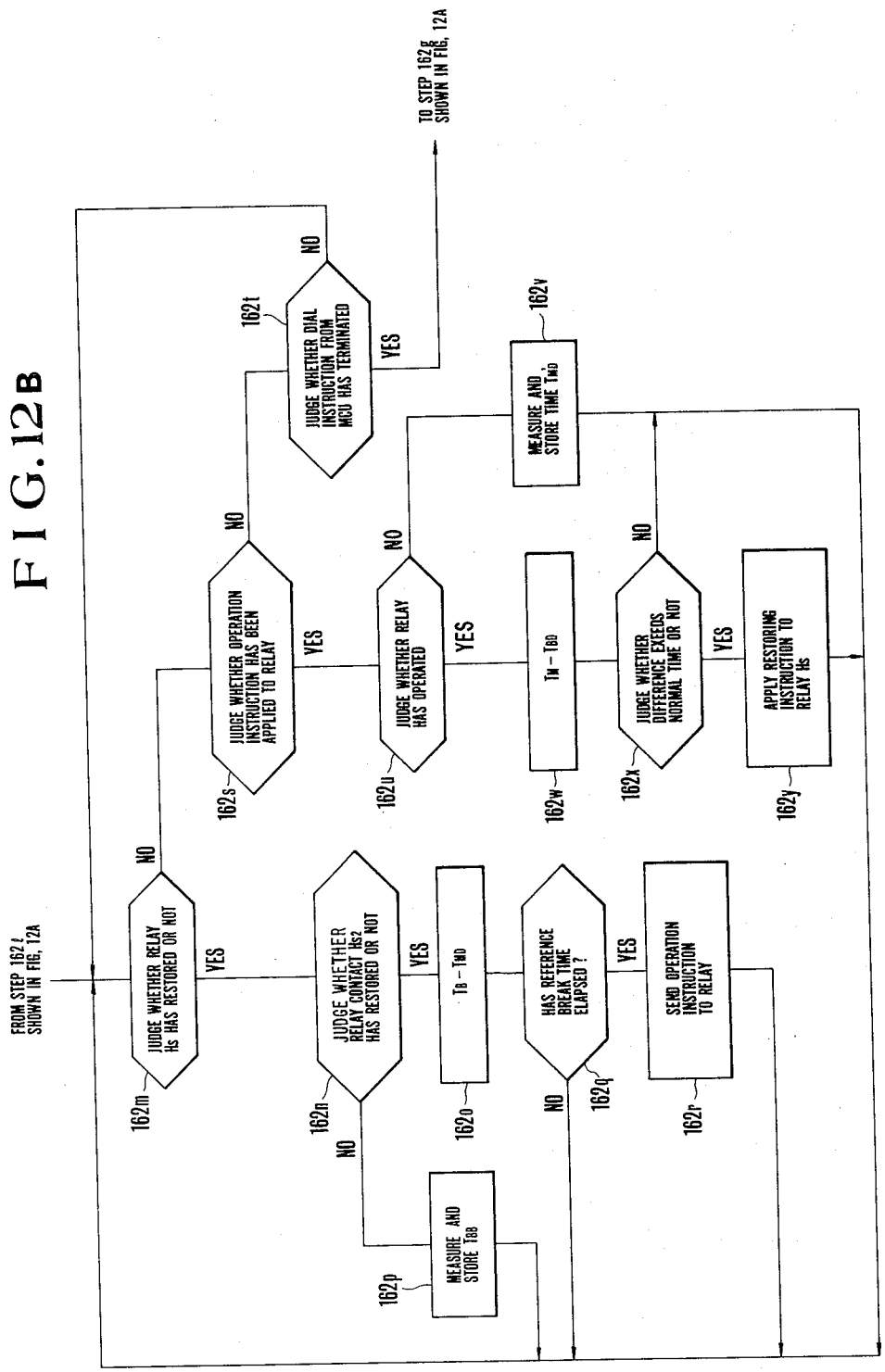

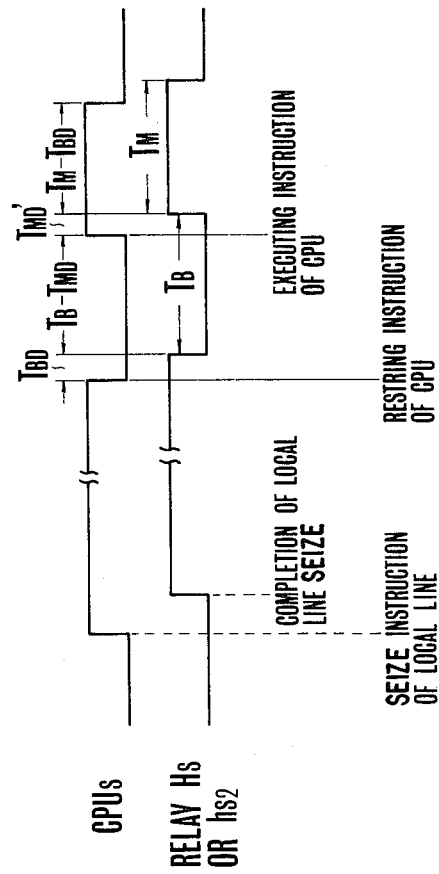

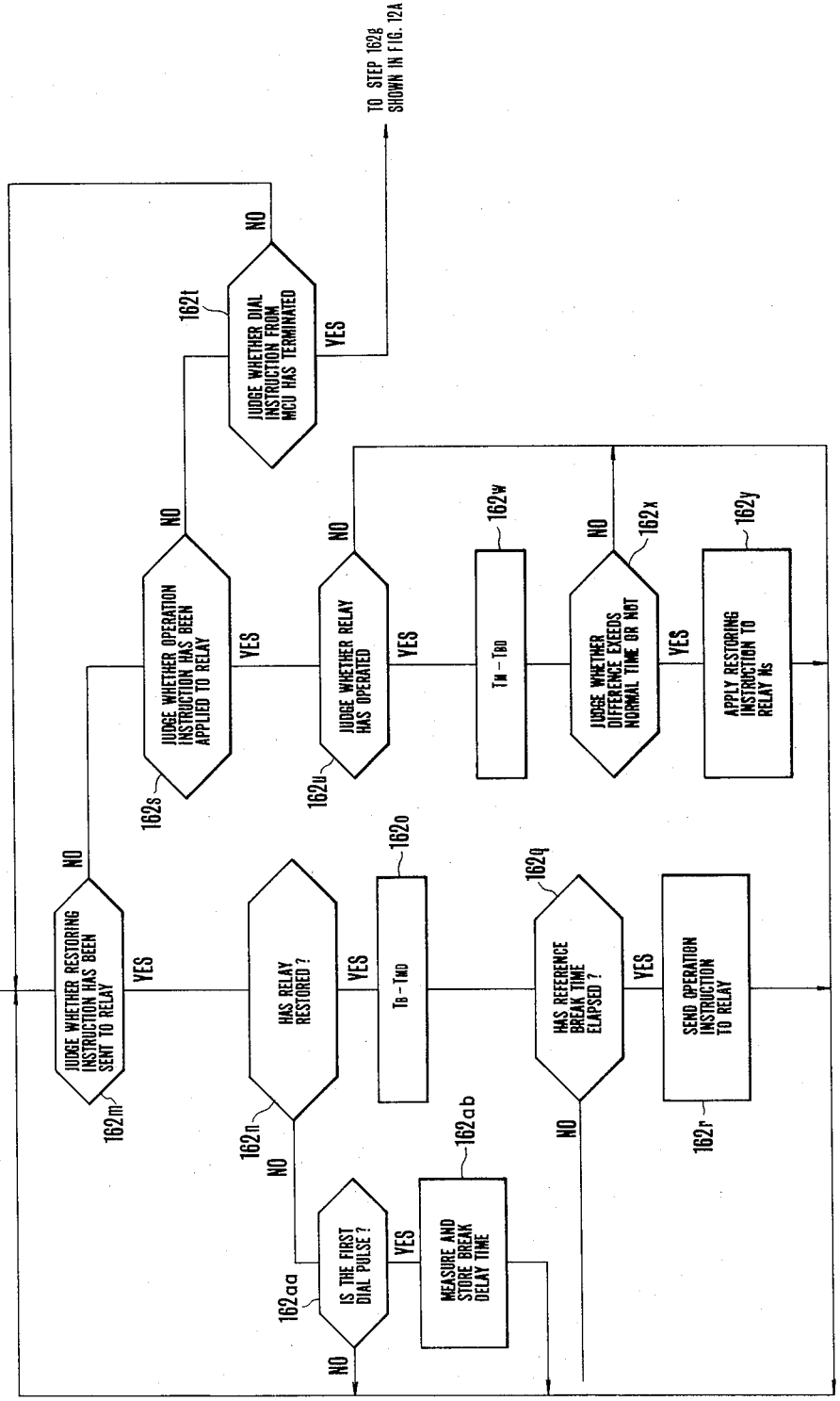

KEY TELEPHONE SYSTEM WITH MULTIPLE PROCESSOR CONTROL

BACKGROUND OF THE INVENTION

This invention relates to a button (or key) telephone exchange system for interconnecting a local line from a telephone office and one of several telephone sets and for switching the connections between telephone sets by utilizing the office lines.

A prior art key telephone exchange system is constituted by a main device consisting essentially of relay circuits and telephone sets each including mechanical lock buttons or keys connected to the main device with a plurality of interior wiring connections and constructed such that, by the manipulation of the mechanical lock buttons, the mutual connection between the telephone sets on the office line is selected to enable talking between the telephone sets by transmitting an origination signal and receiving a call request signal through an office line, talking power being supplied from the main device. In almost all cases the main device has only the capabilities of establishing a connection to the office line and of supplying the talking power.

For this reason, the number of the wiring connections to respective telephone sets increases with the number of sets, which not only increases the cost of installation but also makes it difficult to maintain the system. Moreover, as the main device is constituted by relays not only does the size become bulky but the reliability of operation also decreases as the number of sets is increased. In addition it becomes extremely difficult to maintain good service, for example control of the origination and call request reservation of the office line, etc.

As an approach for solving these problems, a system has been proposed wherein a control processor is provided in common for the local line and the telephone line for processing information signals originating from and sent to an office line unit and a telephone unit so as to switch the connections as disclosed, for example, in U.S. Pat. No. 4,125,749 issued to Kinoshita et al on Nov. 14, 1978. According to this system, however, since the transmission and reception of all information between the processor and the local line unit and the telephone set unit are made through the same routine, it is necessary to process various information signals and to transmit and receive the information signals, so that where the number of office lines and the number of telephone sets is large, the time necessary for processing all information is increased, thus making quick response of operation impossible.

SUMMARY OF THE INVENTION

Accordingly, it is the principal object of this invention to provide a button telephone exchange system capable of decreasing the time required for switching the connections between an office line and a plurality of key telephone sets and between the key telephone sets themselves, thereby shortening the time required for switching the connections and simplifying the process of switching the connections.

Another object of this invention is to provide a key telephone exchange system capable of readily providing various services at low cost.

Still another object of this invention is to provide a key telephone exchange system having a small size, yet a high reliability.

A further object of this invention is to provide a key telephone exchange system capable of decreasing the number of wiring connections between the key telephone units and the control unit and which can readily be installed, maintained and inspected.

A still further object of this invention is to provide a key telephone exchange system capable of controlling the origination and call request to and from the key telephone sets.

According to the present invention, these and further objects can be accomplished by providing a key telephone exchange system comprising a main control unit provided with a processor, a plurality of office line units provided for respective office lines, each office line unit including a processor, means for detecting a call request and means for seizing an office line, and a plurality of terminal units respectively connected to key telephone sets via speech lines and data lines; each terminal unit including a processor, means for transmitting and receiving data to and from a telephone set, and means for exchanging connections, the processor of the main control unit comprising means for checking information of the office line units and of the terminal units, and means for controlling the office line units and the terminal units in accordance with a result of the checking for exchanging connections between the office lines and the key telephone sets and also between the key telephone sets.

BRIEF DESCRIPTION OF THE DRAWINGS

In the accompanying drawings:

FIGS. 12A and 12B, when combined, are a flow chart showing the detail of the step 16 of the flow chart shown in FIG. 6 concerning an office line unit;

FIG. 13 is a time chart showing the operation of a central processing unit CPU and a relay HS;

FIG. 14 is a flow chart showing modified steps which follow the steps shown in FIG. 12A;

DESCRIPTION OF THE PREFERRED EMBODIMENTS

The invention will now be described with reference to the accompanying drawings.

Figure 1:
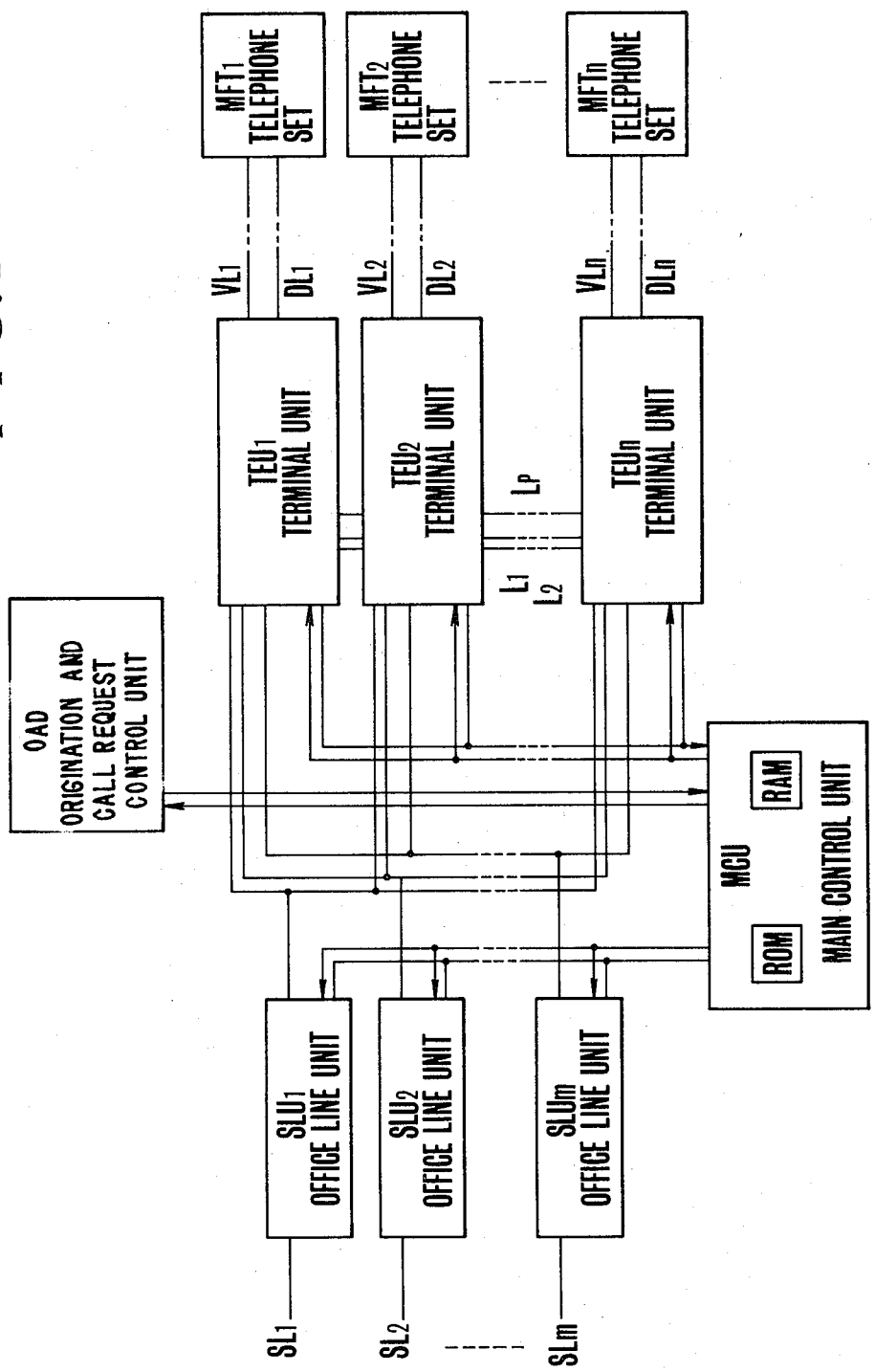
FIG. 1 is a block diagram showing the entire key telephone exchange system embodying the invention.

In a preferred embodiment of this invention shown in FIG. 1, office lines SL1 to SLm from a telephone office, not shown, are connected to office line units SLU1 to SLUm respectively, and only voice or speech signals separated thereby are supplied in parallel to respective terminal units TEU1 to TEUn. The voice signals are switched among a plurality of telephone sets MFT1 to MFTn through cross-points each utilizing an analog circuit.

Link circuits L1 to Lp are provided between adjacent terminal units TEU1 to TEUn so as to enable switching among telephone sets MFT1 to MFTn via the cross-points.

Each one of the terminal units TEU1 to TEUn and each one of the telephone sets are interconnected by four lines of the voice lines VL1 to VLn and data lines DL1 to DLn and data signals comprising the voice signals and FS signals (frequency shifted signals) are transmitted and received through line transformers, not shown, for respective terminal units TEU1 to TEUn and respective telephone sets MFT1 to MFTn. A source voltage is supplied to respective telephone sets from the terminal units TEU1 to TEUn via the neutral points of the line transformers provided for the voice lines VL1 to VLn and the data lines DL1 and DLn, respectively.

In addition, processors in the form of microprocessors, for example, are provided for the main control units MCU, the office line units SLU1 to SLUm and the terminal units TEU1 and TEUn. The processors of the terminal units TEU1 to TEUn decode and hold information signals transmitted from the telephone units MFT1 to MFTn as well as call request information signals supplied by the main control unit MCU and send the call request information signals to respective telephone sets MFT1 to MFTn and the origination and call request information signals to the main control unit. The process of the main control unit checks the origination information signals from the terminal units TEU1 to TEUn as well as the call request information signals from the line units SLU1 to SLUm and the information signals provided by the origination and call request control unit OAD and provides instruction information signals to the office line units SLU1 to SLUm and to the terminal units TEU1 to TEUn according to the result of the check, thus controlling the switching operation of the entire telephone system.

Each one of the telephone sets MFT1 to MFTn is provided with a required number of non-lock button or key switches and display lamps, a dial for office line origination, a buzzer or bell for indicating a talking line and a call request, a processor and a MODEM (modulator/demodulator). The processor decodes information signals produced by the operation of the button switches and dial information signals generated by the dial operation for controlling the MODEM to send out these information signals as data signals. Further, the MODEM of each telephone set receives the data signal from the MODEM at each one of the terminal devices TEU1 to TEUn. The processor of each telephone set decodes the output of its own MODEM to operate the display lamp, the buzzer or the bell.

Figure 2:
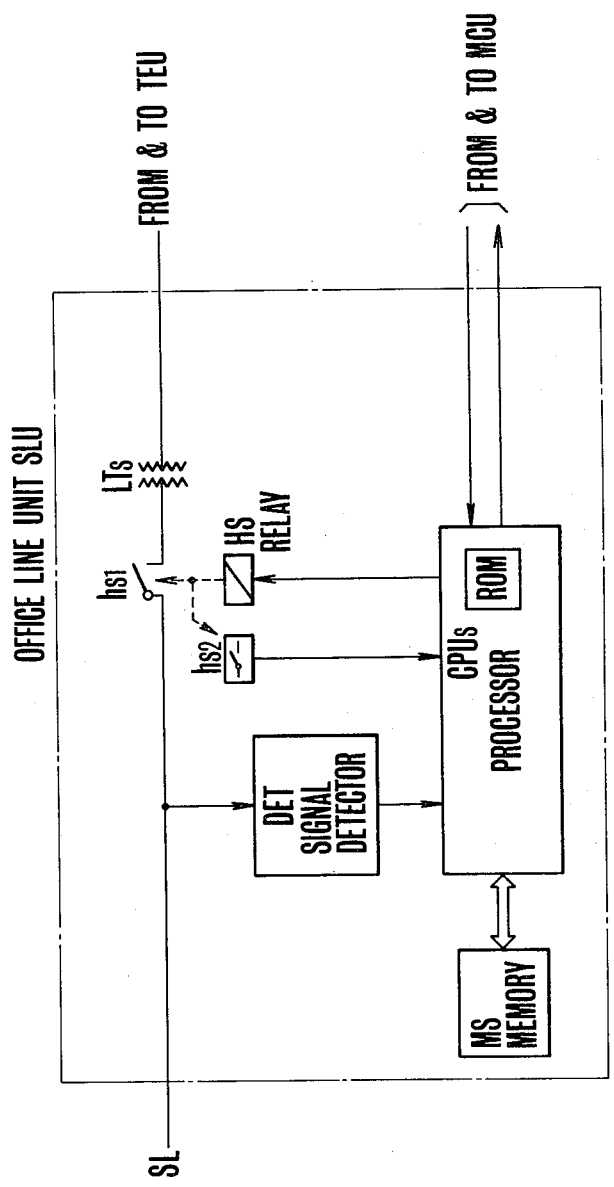
FIG. 2 is a block diagram showing an office line unit.

One of the office line units SLU1 to SLUm is shown in FIG. 2. As shown, a calling signal sent from the telephone office via an office line SL is detected by a signal detector DET utilizing a diode circuit, photocoupler etc., and the detected signal is supplied to a processor CPUs as a call request signal. Processor CPUs controls the operation of a relay HS. When contact $h_{s1}$ of relay HS is closed, a loop circuit is established through the primary winding of a line transformer LTs. At the same time, by the operation of the relay HS controlled by the processor CPHs, a contact $h_{s2}$ is ON-OFF controlled to send out dial pulses. A memory device MS is connected to the processor CPUs for temporarily storing information signals.

Figure 3:
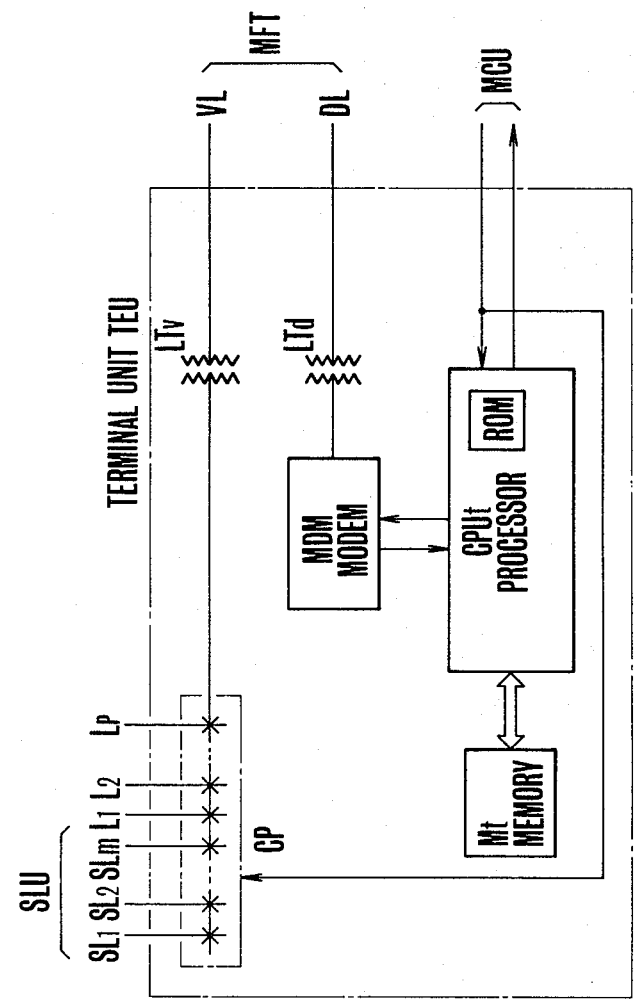
FIG. 3 is a block diagram showing a terminal unit.

FIG. 3 is a block diagram showing one of the terminal units TEU1 to TEUn in which a voice line VL from a telephone set MFT is connected to office lines SL1 to SLm through a line transformer LTv, a cross-point circuit CP and office line units SLU1 to SLUm or to link circuits L1 to Lp. The cross-point circuit CP is rendered ON by the control of the main control unit MCU for performing a predetermined switching.

A data line from the telephone set MFT is connected to a MODEM MDM (modulator/demodulator) via the line transformer LTd. The MODEM MDM sends out a data signal as a signal FS utilizing a voice frequency under the control of the processor CPUt and demodulates the signal FS from the telephone set MFT for supplying the demodulated signal to the processor CPUt.

Figure 4:
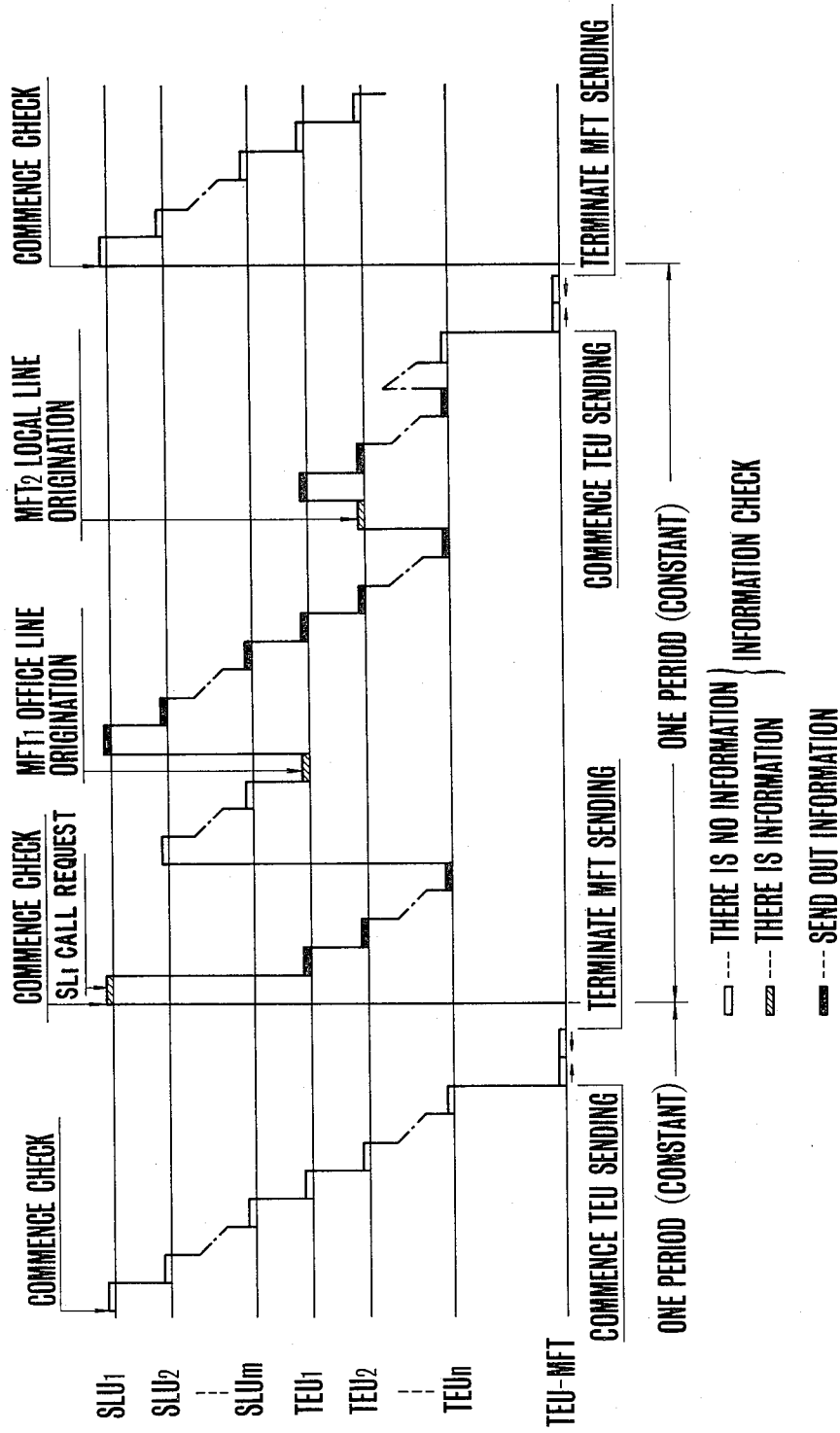
FIG. 4 is a time chart useful to explain transmission and reception of information between respective units and telephone sets effected by a main control unit.

The time chart shown in FIG. 4 shows transmission and reception of information signals between the office line units SLU1 to SLUm and the terminal units TEU1 under the control of the main control unit MCU as well as the transmission and reception of information signals between the terminal units TEU1 to TEUn and the telephone sets MFT1 to MFTn. The presence or absence of any origination and call request information in respective office line units SLU1 to SLUm and the terminal units TEU1 to TEUn is determined when the main control unit MCU sends out a polling signal to initiate a check. Since any one of the units may be holding information, the polling signal is sequentially sent to respective units (as illustrated) to complete the check. Upon completion of the information check the main control unit MCU applies a "TEU send out" initiation to the terminal units so that all terminal units TEU1 to TEUm can send data signals to the telephone sets MFT1 to MFTn.

Upon completion of the sending out of the data signals to the telephone sets, all telephone sets MFT1 to MFTn are simultaneously enabled to send out their data signals, and if there is information transferred it is held in terminal units TEU1 and TEUn.

When the sending out of the data signals from the telephone sets MFT1 to MFTn is terminated by an "MFT sending out termination instruction", the main control unit MCU again performs a "check initiation" at a predetermined period of, for example 75 milliseconds. As a consequence, if the "MFT sending out termination instruction" were issued at an intermediate point of this period, the check initiation would be made during the remaining interval of the period. Where there is a call request from an office line after the previous check time, since the call request information is given from an office line unit SLU1, the telephone sets immediately and sequentially send the call request information signals to the terminal units TEU1 to TEUn and these signals are held by the memory devices Mt of respective terminal units TEU1 to TEUn.

Then, the office line unit SLU2 is checked and if there is no information, the office line units are sequentially checked up to the unit SLUm, and then the check is transferred to the terminal unit TEU1. If thereafter there is no information "all TEU sending out initiation instruction" is issued. Where origination and paging are made after the previous check time, since the origination and call request signals are held by the terminal unit TEU1 in accordance with the sending out of the data signal from the telephone unit MFT1, so that if this information is an office line origination (as illustrated), an information signal regarding this fact would be sent to and held by respective office line units SLU1 to SLUm. This information signal is also applied to respective terminal units TEU1 to TEUn so as to cause the terminal unit TEU2 to hold the reply of confirming the origination and to cause the terminal unit TEU2 and succeeding terminal units to hold an instruction indicating that the telephone set MFT1 is busy.

Where the telephone set MFT2 has made a local origination after the previous check (such as illustrated for set MFT2), this information is given to only the terminal units TEU1 to TEUn and the telephone set MFT2 would hold an instruction indicating that it is busy.

As above described, whenever generation of an information signal is confirmed, the main control unit MCU transmits and receives necessary information signals and then checks other terminal units TEU3 to TEUn and causes respective terminal units TEU1 to TEUn to send out data signals representing information by sending again the "TEU sending out instruction" and also causes respective telephone sets MFT1 to MFTn to send out data signal. When the "TEU sending out instruction" is issued again, respective terminal units TEU1 to TEUn send out data signals indicative of respective information and the telephone sets MFT1 to MFTn again send out data signals.

An a consequence, in each of the telephone sets MFT1 to MFTn, a call request from the office line SL1 is displayed, and in the telephone sets MFT1 and MFT2, displays are made showing that they have come to originating states, whereas in the other telephone sets MFT3 to MFTn displays are made showing that the telephone sets MFT1 and MFT2 became busy.

Similarly, information regarding dial tones, talking termination, etc. from respective telephone sets MFT1 to MFTn are sent to respective terminal units TEU1 to TEUn by sending out data signals.

As a result, upon completion of the transmission and reception of information signals between the main control unit MCU and respective office line units SLU1 to SLUm and the terminal units TEU1 to TEUn, all information signals are transferred to respective telephone sets MFT1 to MFTn, while the information signals are also transferred from respective telephone sets, MFT1 to MFTn, the time required for checking the information can be greatly reduced than in a case wherein the information signals from the office lines SL1 to SLm and the telephone sets MFT1 to MFTn are checked independently for transmitting and receiving the information at each time.

For example, assume that the number of office lines is 4, the number of telephone sets MFT is 12, that each processor CPU utilizes signals of 4 bits each, and that the clock pulse frequency is 2 MHz, the execution speed of an instruction set would be about 300 steps/one millisecond with the result that when an information signals is generated, transmitted and received, the time required by each office line unit SLU or terminal unit TEU would be about 1 millisecond, and the time required between the "check initiation" and the "TEU sending out" initiation would be about 16 milliseconds at the maximum. Assuming that the transmission speed of the data signals is 800 bits/sec., and that one word of a data signal comprises 11 bits, the interval between the TEU sending out initiation and termination of transmission of a data signal to a telephone set MFT would be about 14 milliseconds. The time required for transmitting data in the opposite direction is the same as before so that the maximum time required between a check initiation instruction and the next check initiation instruction is about 40 to 50 milliseconds, which does not cause any appreciable delay in the use of the telephone set.

Figure 5:
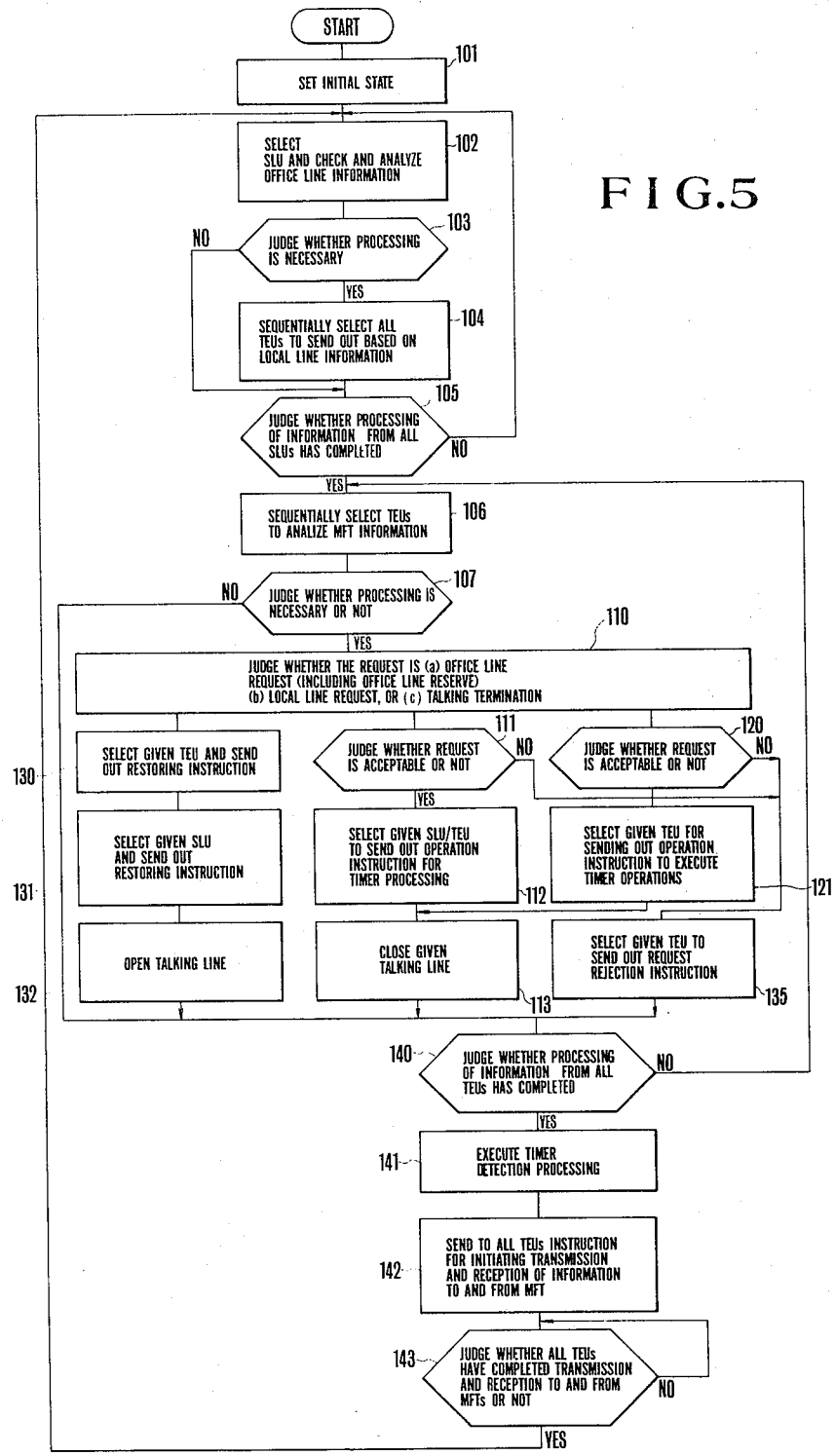
FIG. 5 is a flow chart useful to explain the operation of the main control unit for executing the operation shown in FIG. 4.

FIG. 5 is a flow chart showing the state of operation of the main control unit MCU necessary for the transmission and reception of the information signals described above and for executing various controls. Thus, according to instructions stored in a read only memory device (ROM) in the processor CPUm the controls are executed while storing data in a random access memory device RAM also contained in the processor.

At first, after setting the initial state at step 101, an office line unit SLU is selected at step 102 to check and analyze the information contained therein. At step 103 a judgment is made as to whether processing is necessary or not, and when the result is YES, at step 104, all terminal units TEU are sequentially selected to send out instructions based on the local line information. At step 105, a judgment is made as to whether the processing of information sent from all office line units SLU has been completed or not and when the result is YES, the program is advanced to step 106 at which the terminal units TEU are sequentially selected to analyze the information regarding the telephone sets MFT. At step 107, a judgment is made as to whether processing is necessary or not and when the result is YES, the following processing operations are performed after step 107. Namely, based on the office line origination, a local line origination and a set information from the origination and call request control unit OAD, at step 110, a judgment is made whether the request is (a) office line talking request, (b) a local line talking request including an office line reserve (c) or a talking termination. In the case of the office line request, after executing an office line request to be described later, at step 111 a judgment is made as to whether the request is acceptable or not, and when the result is YES, at step 112 corresponding SLU/TEU are selected to send out an operation instruction to then control the cross point CP. Then, at step 113, a selected talking line is established to complete an exchange switching.

When the result of judgment at step 110 is the local line talking request, the program is advanced to step 120 where a judgment is made as the whether the request is acceptable or not depending upon whether all link circuits L1 to Lp are in talking states or not, and when the result is YES, at step 121 a given terminal unit TEU is selected to send out an operation instruction to execute a timer processing operation thereby establishing the selected talking line.

Upon completion of the talking states described above, a talking termination is judged at step 110. Then, the program is advanced to step 130 where a given terminal unit TEU is selected to send out a restoring instruction and at step 131 an office line SLU is selected to send out a restoring instruction. Then, at step 132 the talking line is opened to restore the switching connection state.

Upon completion of these processing steps, the program is advanced to step 140 to judge whether the processing of information from all terminal units TEU has been completed or not. Then, at step 141 a timer detection processing operation is executed as will be described hereinafter, and at step 142 to all terminal units TEUs is sent an instruction to initiate transmission and reception of information to and from a telephone set MFT to permit it to transmit and receive data signals between the terminal units TEU1 to TEUn and the telephone sets MFT1 to MFTn. At step 143, a judgment is made as to whether the transmission and reception of information between all terminal units TEU and the telephone sets MFT have been completed or not. When the result of the judgment is YES, one period starting from the check initiation shown in FIG. 4 is completed.

When the result of step 111 or 120 is NO, the program is advanced to step 135 where a given terminal unit TEU is selected to send out a request rejection instruction. Thereafter, the program is advanced to step 140.

The local line reservation is made by depressing an office line selection button of a telephone set MFT before going off-hook thereby seizing an office line SL, provided that one of the office lines SLl to SLm is idle. This office line reservation is automatically released when no origination is made during a predetermined interval, for example 5 seconds, after depression of the office line selection button.

In the case of a local line talking request the circuit is restored when a called party does not respond in a predetermined interval, 30 sec. for example. For the purpose of limiting these intervals, a timer is contained in the processor CPUm, which is started during a predetermined interval after a local line talking request selecting a given SLU/TEU to send out an operation instruction. The timer also sends out an instruction to select and operate that terminal unit TEU. The timer is stopped at each sending out of such instructions during the operation of the timer.

Accordingly, in the timer processing, subsequent to the completion of the processing of information from all terminal units TEU, the fact that the all timers have been timed out is checked and the program is advanced to the next step.

Figure 6:
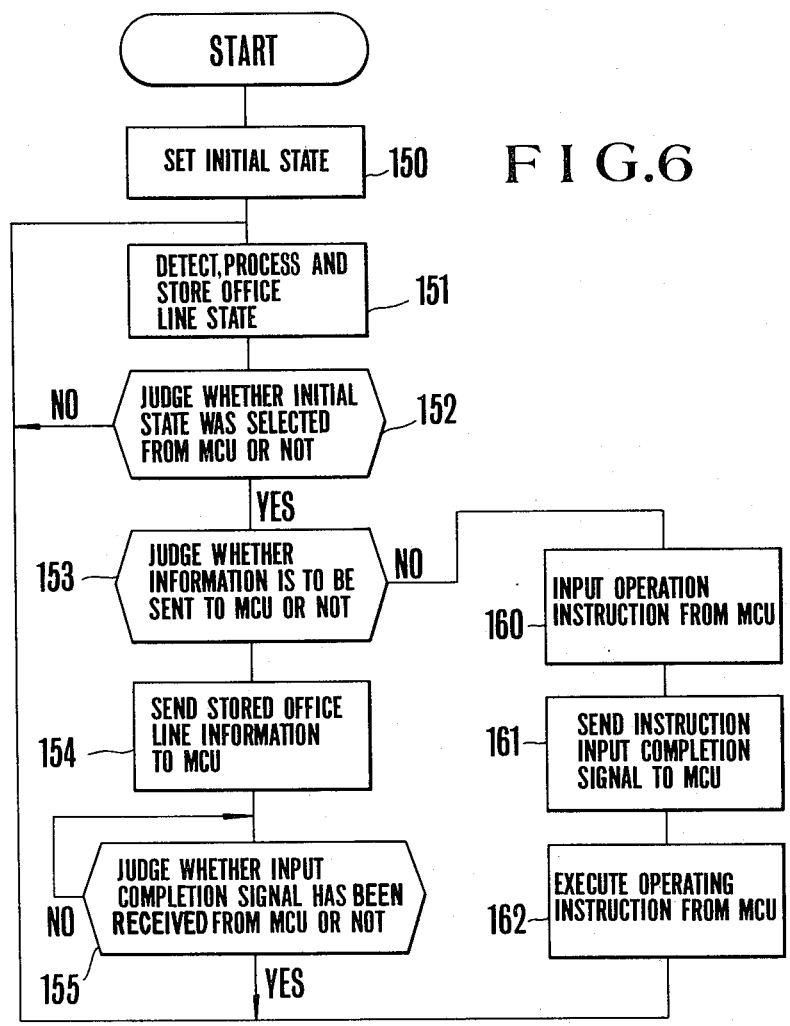
FIG. 6 is a flow chart showing the operation of the local line unit.

FIG. 6 is a flow chart showing the operations of the office line units SLU1 to SLUm which are executed by the processor CPUs according to its instructions stored in the ROM.

More particularly, after setting the initial state at step 150, detection, processing and storing of the office line states are executed at step 151. Then at step 152 a judgment is made whether the initial state was selected from the main control unit MCU or not. When the result of judgment is YES, at step 153 a judgment is made as to whether information is to be sent to the main control unit MCU or not. When the result is YES at step 154, the stored office line information is sent to the main control unit MCU. Then at step 155 a judgment is made as to whether an input completion signal has been received from the main control unit MCU or not. When the result of this judgment is YES, sending out of the information to the MCU is completed and the program is returned again to the step 1.

When the result of judgment at step 153 is NO, the program is advanced to step 160 at which an operation instruction is inputted from the main control unit MCU. Then, at step 161 an input completion signal is sent to the central control unit MCU and the operation instruction from the main control unit MCU is executed at step 162 to close a loop for the office line SL and to send out the dial pulses.

Figure 7:
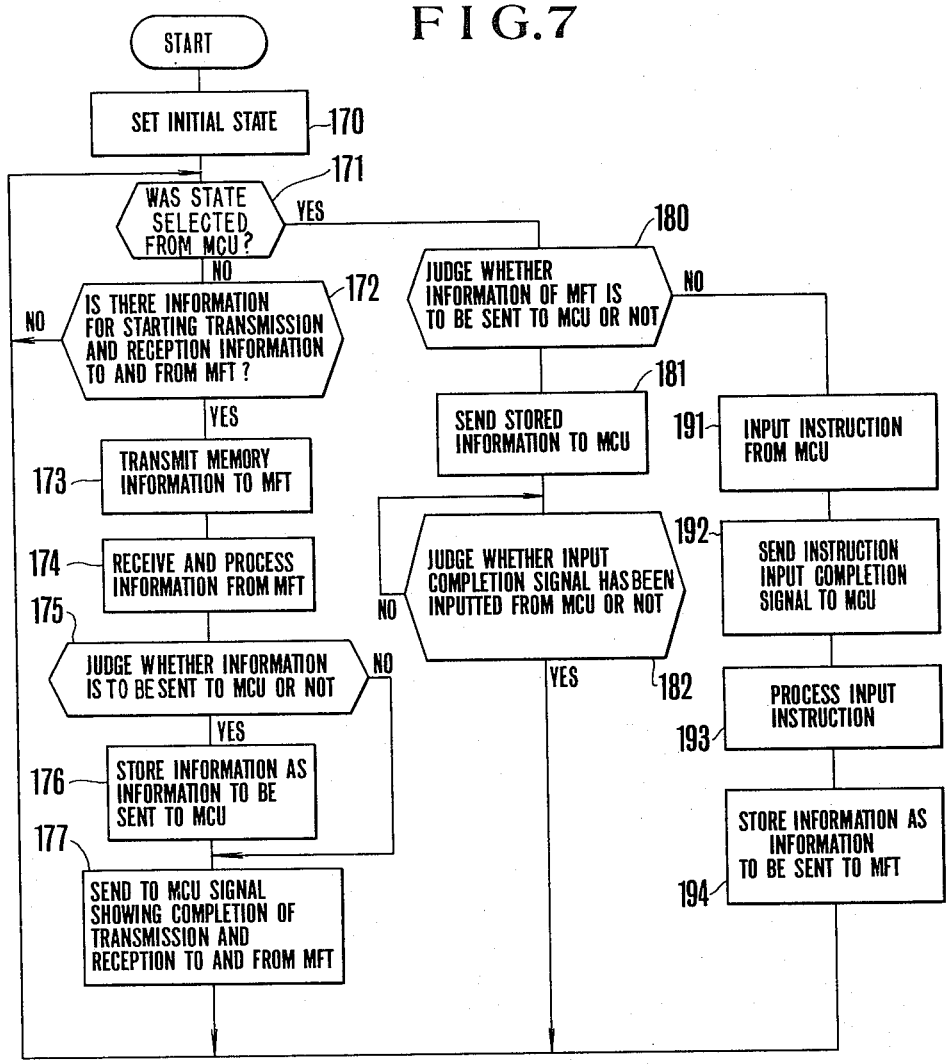
FIG. 7 is a flow chart showing the operation of a terminal unit.

FIG. 7 is a flow chart showing the operations of the terminal units TEU1 to TEUn according to which the processor CPUt executes the instructions stored in its ROM.

Thus, after setting the initial state at step 170, a judgment is made as to whether the initial state has been selected from the main control unit MCU or not. When the result of judgment is NO, at step 172 a judgment is made as to whether there is an instruction for starting transmission and reception of information to and from a telephone set MFT. When the result is YES, at step 173 memory information is sent to the telephone set MFT. Then, at step 174, the information from the telephone set is received and processed. At step 175 a judgment is made as to whether information is to be sent to the main control unit 175 or not. When the result is YES, at step 176 the information is stored as MFT information to be sent to the main control unit MCU. Then, at step 177, a signal showing completion of transmission and reception of information to and from the telephone set MFT is sent to the main control unit MCU.

When the result of judgment at step 171 is YES, the program is advanced to step 180 where a judgment is made as to whether information of a telephone set MFT is to be sent to the main control unit MCU or not. If the result is YES, at step 181, information stored as MFT information to be sent to the main control unit MCU is sent thereto. Then, at step 182 a judgment is made as to whether an input completion signal has been inputted from the main control unit MCU or not. When the result is YES, the sending out of the information is terminated and the program is returned again to step 171.

When the result of judgment of step 180 is NO, at step 191 an instruction from the main control unit MCU is inputted. Then at step 192 an instruction completion signal is sent to the main control unit MCU. Then at step 193 the input instruction is processed, and at step 194 the information is stored as information to be sent to the telephone set MFT and the stored information is held until the memory information is sent to the telephone set MFT.

Figure 8:
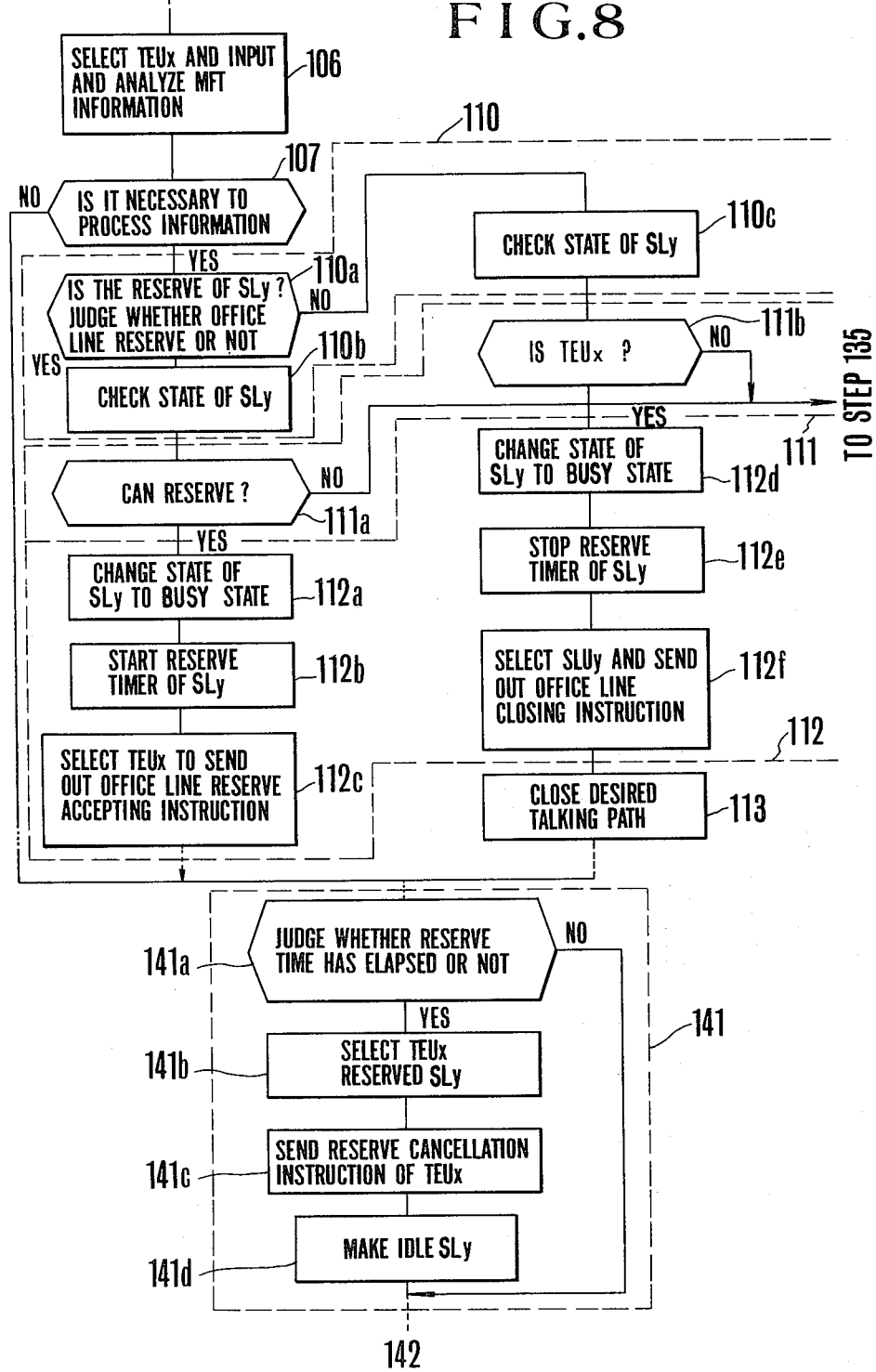
FIG. 8 is flow chart showing the detail of the office line reserving operation.

FIG. 8 is a flow chart showing in more detail the office line reserving operation described above, which corresponds to the office line reserve routine at the time of an office line talking request shown in FIG. 5.

FIG. 8 shows a case wherein a certain telephone set MFTn is reserving an office line SLy. More particularly, at step 106, a terminal unit TEUx is selected and MFT information is inputted and analyzed. At step 107, a judgment is made whether processing of the information is necessary or not. When the result is YES, the program is transferred to step 110a which constitutes a portion of the step 110 shown in FIG. 5 to judge whether the information corresponds to a reservation of an office line SLy or not. When the result is YES, at step 110b, the state of the office line SLy is checked in accordance with the states of respective office lines LS1 to LSm which have been stored in the RAM of the processor CPUm. When the result shows that the line is busy or not at step 111a of step 111, a judgment is made whether the reservation can be made or not, and when the result is YES, at step 112 reservation information is written into an address of a RAM which is provided to store the state of the office line SLy. Thereafter, at step 112a, the state of the office line is reserved.

At step 112b, a reserving timer of the office line SLy that controls above described definite time is started, and at step 112c a terminal unit TEUx is selected to send out an office line reservation accepting instruction.

When the result of step 110a is NO, and when the office line selection button is depressed after going off-hook, or where an origination operation is made before the time out of the reserving timer, at step 110c after checking the state of the office line SLy, a judgment is made at step 111b comprising a portion of the step 111 as to whether the terminal unit which has done the origination operation is the terminal unit TEUx that has reserved an office line or not. When the result of the judgment is YES, at step 112d comprising a portion of the step 112 a busy information signal is written into an address of a RAM that stores the information corresponding to the office line SLy to change the state of the office line SLy to busy state. Then, at step 112e, the reserving timer of the office line SLy is stopped.

The program is then transferred to step 112f to select an SLUy thereby sending out an office line closing instruction to complete an office line loop. Then, at step 113, the circuit CP is controlled to close the desired talking path.

Thereafter, after executing step 140 (see FIG. 5), the program is transferred to step 141 where the state of the reserving timer is checked to process a timer detection operation.

More particularly, at step 141a, a judgment is made as to whether the reserving timer has timed out or not. When the result is YES, it means that a definite time has elapsed after reserving the office line but without an origination operation. In such a case, at step 141b the terminal unit TEUx of the reserved office line is selected and at step 141c a reserve cancellation instruction regarding the terminal unit TEUx is sent to the corresponding terminal unit, and the information regarding an idle line is written into an address of the RAM adapted to store the information of the office line SLy. At step 141d the office line SLy is made idle. Thereafter the program is transferred to step 142 (See FIG. 9) to send to all terminal units TEUs an instruction for initiating transmission and reception of the information to and from the telephone sets.

When the result of judgment at step 141a is NO, the program is transferred to step 135 shown in FIG. 5.

When all office lines SL1 to SLm are busy the reserve information of the office lines is memorized. Then, when any one of the office lines, for example SLy, become idle, even a busy line which is desired to be reserved would be reserved. In this case, the following operations are made.

Figure 9:
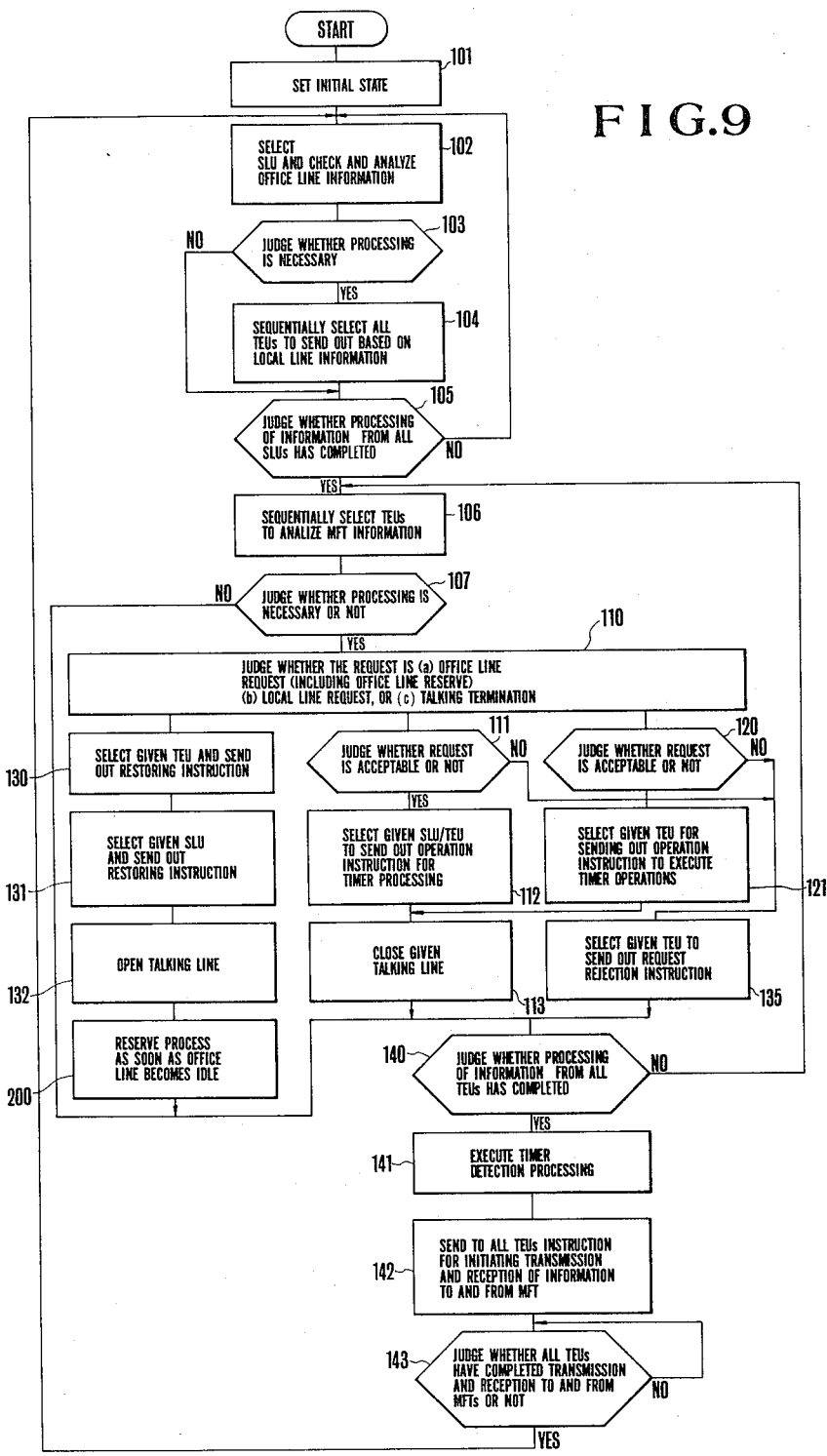
FIG. 9 is a flow chart corresponding to that shown in FIG. 5 and showing the reserve operation of a busy office line.
Figure 10:
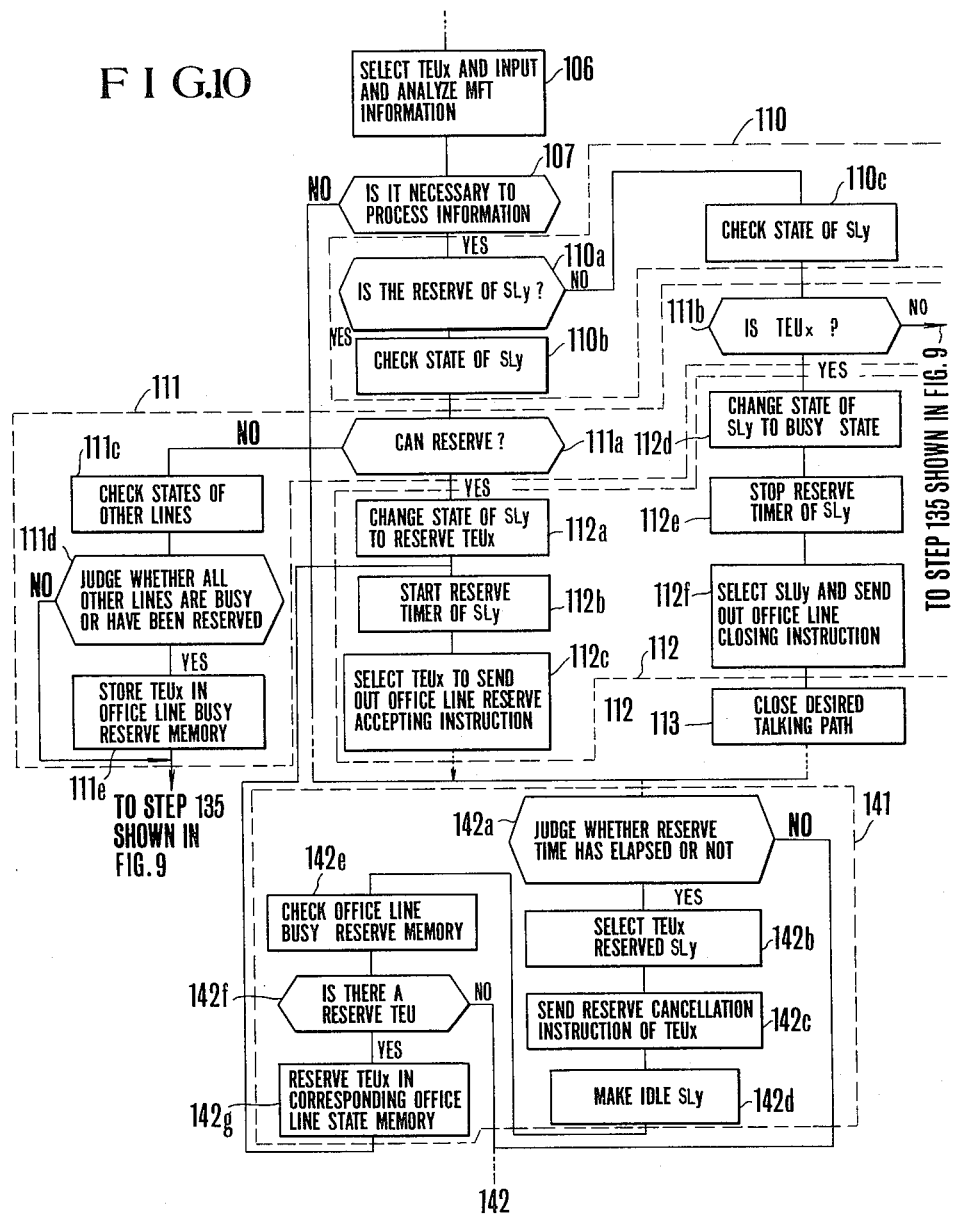
FIG. 10 is a flow chart corresponding to that shown in FIG. 5 illustrating details of the line reserving processing.

FIG. 9 is a flow chart corresponding to that shown in FIG. 5 under a busy line reserving state, and FIG. 10 is a similar flow chart corresponding to FIG. 8.

In FIG. 9, step 132 of a talking termination is followed by a step 200 in which a reserving process is done as soon as an office line becomes idle whereby, when any one of the office lines terminates talking, the talking path of the line becomes idle and when any one of the office lines SLy becomes idle, a reserving process is done.

The flow chart shown in FIG. 10 shows in more detail the operations described above. The operation up to step 110 is the same as that shown in FIG. 8. At step 111a constituting a portion of the step 111 a judgment is made as to whether a reservation can be made or not and when the result of judgment is NO, the program is advanced to step 111c at which all addresses of a RAM corresponding to all office lines are checked for determining the states of other office lines. Then at step 111d a judgment is made as to whether all office lines are busy or have been reserved or not, and when the result is YES, at step 111e the terminal unit TEUx information is stored in a busy reserving memory device of the office line SLy. When the office line SLy becomes idle an information signal indicating that the state of the terminal unit TEUx is immediately changed to an office line reserving state is written into a predetermined address of the RAM. The subsequent processing up to step 142 is the same as that shown in FIG. 8.

At the last step 142d of the step 142, the office line LSy is made idle, and then at step 142e, the busy reserving memory device of each office line is checked. Then, at step 142f, a judgment is made as to whether there is a reserve terminal unit or not. When the result of judgment is YES, at step 142g, a terminal unit TEUx to be reserved is reserved in a corresponding office line state memory device so as to store the information in a predetermined address of the RAM. Thereafter the program is returned to step 112b. When the result of judgment at step 142f is NO, the program is returned to step 143 shown in FIG. 9. Other operations are similar to those of FIG. 8.

Figure 11:
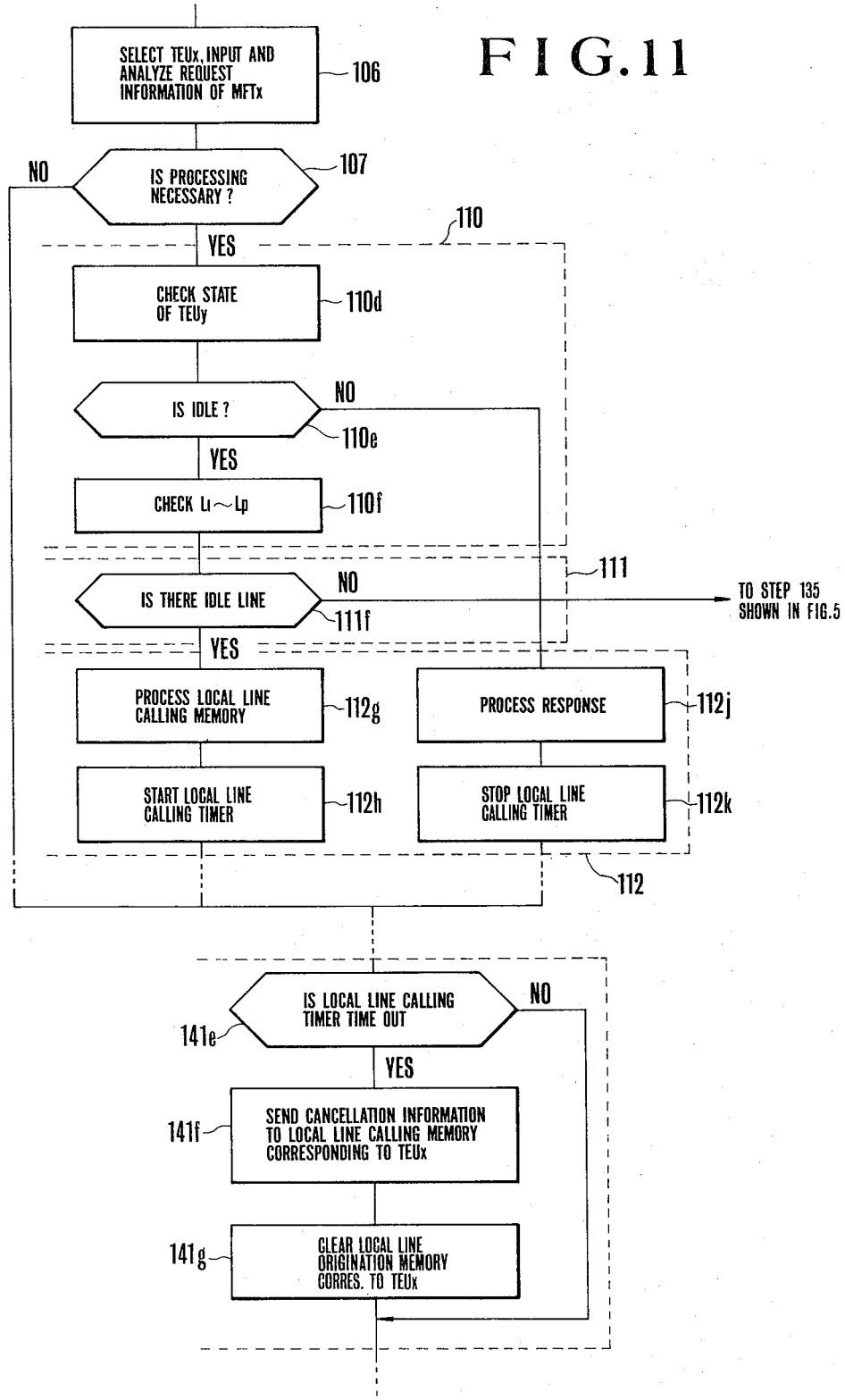
FIG. 11 is a flow chart showing the detail of the operation of the automatic resetting at a time when a called party does not respond during intra-office operation.

FIG. 11 is a flow chart showing in more detail the operation of automatically restoring the states after elapse of a predetermined time when a called party does not respond at the time of a local talking request, and corresponds to the local talking request routine of FIG. 5.

FIG. 11 shows a case wherein one telephone set MFTx calls another telephone set MFTy. At step 106, the main control unit MCU selects a terminal unit TEUx and inputs and analyzes a request information of the MFTx. Then at step 107, a judgment is made as to whether processing is necessary or not. When the result of judgment is YES, at step 110d comprising a portion of step 110, the state of the called party terminal unit TEUy is checked by checking respective addresses of a RAM storing the states of respective terminal units TEU1 to TEUn. Then, at step 110e, a judgment is made as to whether the called party terminal unit TEUy is idle or not. When the result is YES, at step 110f addresses of the RAM storing the states of link circuits L1 to Lp are checked by checking the link circuits L1 to Lp. Then, at step 111f comprising a portion of the step 110, a judgment is made whether there is an idle line or not. When the result of the judgment is YES, the program is advanced to step 112g comprising a portion of the step 112 at which information showing that the terminal unit TEUx has made an origination to the terminal unit TEUy is stored in a memory device corresponding to the terminal unit TEUx among the local line origination memory devices of the RAM corresponding to respective terminal units TEU1 to TEUn. Then, at step 112h a local line calling timer is started which defines a predetermined time during which MFTy must respond.

When the judgment at step 110e is NO, at step 112j, a response is processed and at step 112k a local line calling timer is stopped.

When the telephone set MFTy of the called party is idle, a switching connection is made to establish a talking state and at step 141, the state of the local line calling timer is checked by a timer direction processing operation and then at step 141e comprising a portion of the step 141, a judgment is made as to whether the local calling timer has timed out or not. When the result of the judgment is YES, at step 141f cancellation information is sent to a local line origination memory device corresponding to the terminal unit TEUx. Then, at step 142g, a local line origination memory device corresponding to the terminal unit TEUx is cleared.

As above described, the main memory unit MCU checks the information of the office line units SLU1 to SLUm and the terminal units TEU1 to TEUn and controls these units according to the result of the check so as to switch the connections. Each of the telephone sets MFT1 to MFTn is provided with a plurality of button switches corresponding to office lines SL1 to SLm and telephone sets MFT1 to MFTn and those corresponding to the telephone sets MFT1 to MFTn include button switches corresponding to its own telephone set and such button switches are used for such special service as a simultaneous calling.

For this reason, the order of arrangement of the special service button switches is different for each one of the telephone sets MFT1 to MFTn and the processor CPUt of each one of the terminal units TEU1 to TEUn should be constructed such that it can judge the special service according to its loaded position.

Figure 12A:
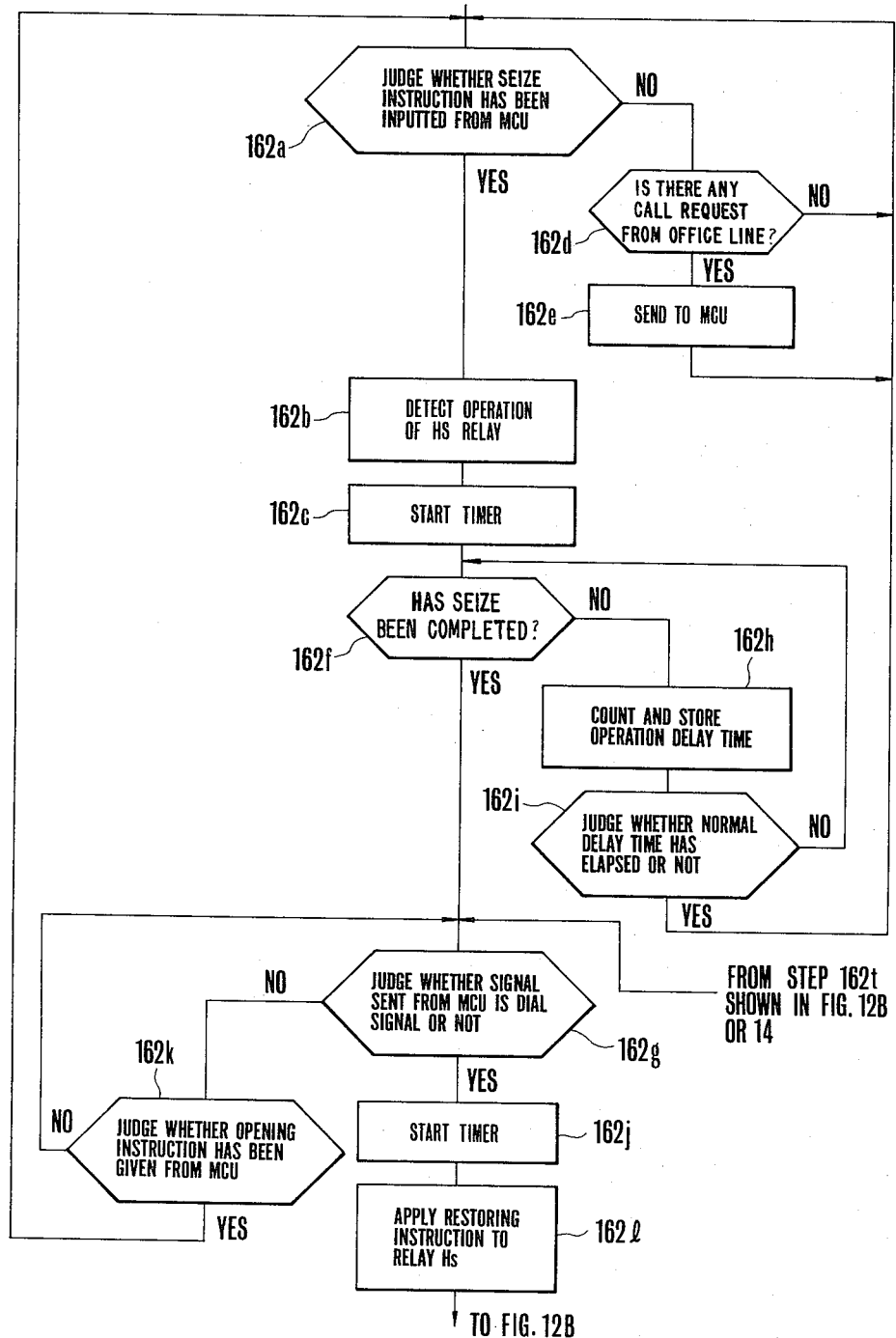

FIGS. 12A and 12B show in more detail the step 162 of the flow chart of the office line unit routine shown in FIG. 6. The relationship among times utilized in the following description is shown in FIG. 13.

As above described, at this step, the closure of the loop and sending out of the dial pulse are performed. At first, at step 162a, a judgment is made as to whether a seize instruction has been inputted from the main control unit MCU or not and when the result of judgment is YES, the operation of the relay HS is detected to close the loop at step 162b. At the next step 162c a timer is started to initiate measuring of the make delay time before the relay control hs2 is closed after receiving the office line seize instruction. When the result of judgment at step 162a is NO, at step 162d a judgment is made as to whether there is a call request from an office line unit or not. When the result of judgment is YES, the program is advanced to the next step 162e whereas when NO, the program is returned to step 162a. At step 162e, a call request is sent to the main control unit MCU and then the program is returned to step 162a.

After starting the timer at step 162c, at step 162f a judgment is made as to whether a seize operation that supervises closure or not of the contact hs2 has been completed or not. When the result of judgment is YES the program is advanced to step 162g.

When the result of judgment at step 162f is NO, at step 162h the interval time $T_{MD}$ between the operation delay time, that is an instant at which the CPUs has given an operation instruction to the relay HS, and the closure of the contact hs2 is counted and memorized.

Then, at step 162i, a judgment is made as to whether the count time has elapsed a normal delay time or not, and when the result of this judgment is YES, the program is returned again to step 162a. On the other hand, when the result is NO, the program is returned to step 162f to repeat the same operation. Finally, a make delay time $T_{MD}$ is determined.

At the step 162g described above, a judgment is made as to whether a signal sent next time from the main control unit MCU is a dial signal or not. When the result of judgment is YES, the program is advanced to the next step 162j to start a timer which measures a break delay time $T_{BB}$ between reception of a break signal of the dial signal of the CPUs of an office line unit and the actual break of the relay contact hs2. When the result of judgment at step 162g is NO, at step 162k, a judgment is made as to whether the instruction from the main control unit MCU is a break instruction or not, whereas when the result is YES, the program is returned to the step 162a. When the result of judgment at step 162k is NO, the program is returned again to stop 162g. Following the processing at step 162j, at step 162l, the CPUs gives a restoring instruction to the relay HS.

Then, the program is advanced to step 162m shown in FIG. 12B wherein a judgment is made as to whether the restoring instruction has been applied to relay HS or not, and when the result of judgment is YES, at the next step 162n a judgment is made as to whether the relay contact hs2 has restored or not. When the result of judgment is YES, the step is advanced to step 162o.

When the result of judgment at step 162n is NO, at step 162p, the CPUs measures and stores the break delay time $T_{BD}$ between sending out of the relay restoring instruction and the breaking of the relay contact hs2, such measurement being continued until the relay contact hs2 is opened. At step 162o the make delay time $T_{MD}$ is subtracted from the reference time set $T_B$ (for example, 33 milliseconds), that is an interval between ON and OFF of the contact hs2. In accordance with this difference, at step 162q, a judgment is made as to whether the reference break time has elapsed or not. When the result is YES, an operation instruction is sent to the relay at the next step 162r.

Then, the program is returned back to step 162m to execute similar operations. When the result of judgment at step 162g is NO, the program is returned to step 162m. A case in which the result of judgment at step 162m is NO will now be described. In this case, the step is advanced to step 162s to judge whether the operation instruction has been applied to the relay or not. When the result is NO, at step 162t, a judgment is made as to whether the dial instruction from MCU has terminated or not. When the result is YES, the program is returned to the step 162g shown in FIG. 12A. When the result of judgment at step 162t is NO, the program is returned to step 162m.

When the result of judgment at step 162s is NO, at step 162t, a judgment is made as to whether the dial instruction from the MCU has terminated or not. On the other hand, when the result of judgment at step 162s is YES, at step 162u, a judgment is made as to whether the relay has operated or not. When the result of judgment at step 162u is NO, at step 162v, the time $T_{MD}'$, between application of the operation instruction to the relay from the CPUs and the reclosure of the relay contact $hs_2$ is measured and memorized. Thereafter, the program is again brought back to step 162m.

When the result of judgment at step 162u is YES, the program is advanced to step 162w to substract the break delay time $T_{BD}$ from the reference make time (for example 67 milliseconds) of the dial pulse. Then, at step 162x, a judgment is made as to whether the difference has exceeded the normal time or not. When the result is YES, a relay restoring instruction is issued at step 162y and the program is then returned to program 162m.

By using the steps shown in FIGS. 12A and 12B it is possible to prevent erroneous pulse and erroneous operation caused by the delay of relay operation which occurs between the sending out of an instruction from the CPU and a time at which a dial pulse is sent out to the office line by the operation of the relay. When an office line is seized, the dial relay HS is operated to store the make delay time $T_M$. Thereafter, each time a dial pulse is sent out the make delay time and the break delay time are updated and stored and both the make and break times are corrected so as to send out a correct dial pulse to the office line.

FIG. 14 is a flow chart showing modified steps which follow the steps shown in FIG. 12A. Thus, the flow chart shown in FIG. 14 corresponds to that shown in FIG. 12B and the blocks corresponding to those shown in FIG. 12B are designated by the same reference numerals.

FIG. 14 differs from FIG. 12A in that at step 162n, a judgment is made as to whether the relay has restored or not, and when the result of judgment is NO, at step 162aa, a judgment is made as to whether the pulse is the first dial pulse or not. When the result of judgment is NO, the step is transfered to step 162m. On the other hand, when the result is YES, the step is advanced to step 162ab where the break delay time $T_{BD}$ is measured and stored. Thereafter, the step is returned to step 162m.

As above described, when an office line is seized a dial relay is operated and the make delay time $T_{MD}$ is stored in the memory device MS coupled to the CPUs. The first dial pulse stores the break delay time $T_{BD}$ in the memory device MC. By assuming that these delay times are constant (fixed), the succeeding make break times of the dial impulse can be corrected from these times.

Figure 15:
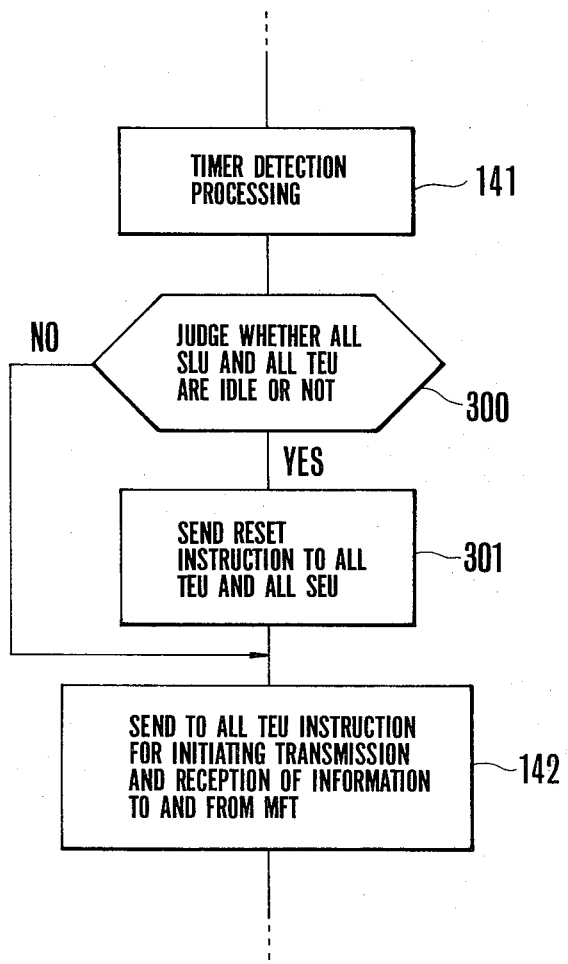
FIG. 15 is a partial flow chart of the main control unit showing a modified embodiment of this invention.

FIG. 15 shows one example of a modification of the flow chart of the main control unit shown in FIG. 5. This modification is effective for a case wherein the states of a terminal unit and of a telephone set corresponding thereto are different. More particularly, as can be noted from the foregoing description, the transmission and reception of the signal between the terminal unit and the telephone set is limited to once in one polling time, for example 75 milliseconds, and according to this limit, information is exchanged between the memory device of the terminal unit and the memory device of the telephone set. For this reason, where various information signals received from office lines or telephone sets are concentrated in a short time, for example in one polling time, information exceeding the storage capacity of the memory device of each terminal unit would be sent. In such a case, in the memory device of the terminal device, new information may be stored on old information regardless of whether the new information is to be sent to a telephone set or has been sent thereto. Accordingly, the states of the terminal unit and the telephone set become different. Thus, for example, in spite of the completion of the operation, the display lamp of the telephone set might remain lighted.

This problem can be solved by the flow chart shown in FIG. 15. More particularly, at step 141, the timer detection processing is executed similar to the flow chart shown in FIG. 5. Thus, after commencing a check as shown in FIG. 4, the office lines SLU1 to SLUm and the terminal units TEU1 to TEUh are checked. Then, at step 300 the processor CPUm judges whether all office line units SLU and all terminal unit TEU are idle or not. In other words, a judgment is made from the content of RAM of MCU as to whether there is no signal to be sent to respective office lines and terminal units and whether these units are idle or not. If the result of this judgment were YES, at step 301, a reset instruction is sent to all office lines SLU and all terminal units TEU for sending the reset instruction to telephone sets via respective terminal units to bring the memory devices of the telephone sets to their initial states. Thereafter the program is returned to the step 142 shown in FIG. 152. With this measure, when the main control unit judges that all office lines and terminal units become idle after completion of their operations, a reset signal is sent once to respective units so that the states of the terminal units and the telephone sets would not become different as above described, thus preventing misoperation.

Figure 16:
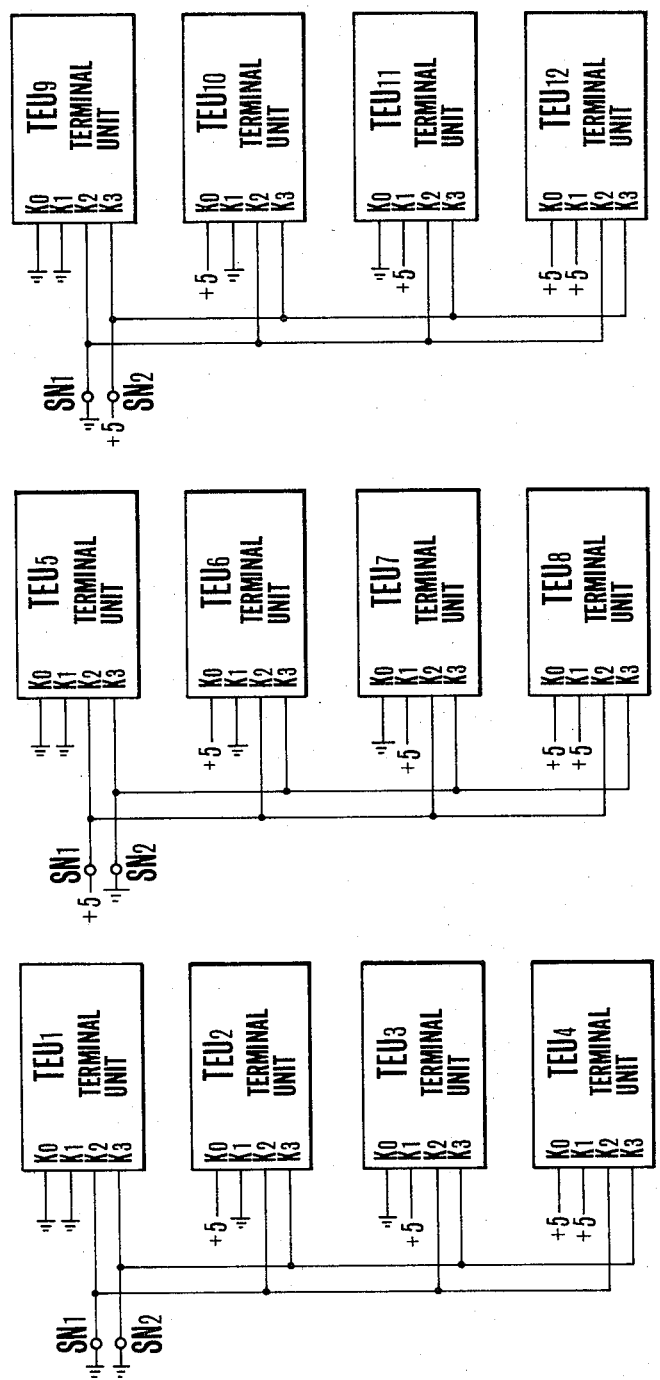
FIG. 16 is a block diagram showing the connection of switch positioning means for special features.

FIG. 16 shows connection diagrams showing positioning means that designates a button switch generating special service information for respective terminal units TEU1 to TEUn according to their actual positions. As shown, the terminal units TEU1 to TEUn are provided with control terminals K0 to K3 from which 4 bit inputs to the processor CPUt are derived out. The position of the position switch which generates a special service information is designated according to a combination of the high and low levels of these inputs.

FIG. 16 shows an example in which there are 12 circuits of the telephone sets MFT1 to MFTn which are divided into 3 groups and different combinations of the control terminals K0 to K1 of each group are grounded to render their levels to be low. Alternatively, a potential of +5 V is applied to make them to be high level. Moreover, common terminals SN1 to SN6 are grouped into different combinations and grounded. Alternately, a voltage of +5 may be applied.

Accordingly, in the telephone set MFT1 connected to the terminal unit TEU1 the button switch at the 0th order of arrangement is used for special service, whereas in the telephone set MFT2 connected to the terminal unit TEU2 the button switch at the first order of arrangement is used for the special service. In the other telephone sets MFT3 to MFT12 the button switches at the second to the eleventh orders of arrangement are used for the special service.

Figure 17:
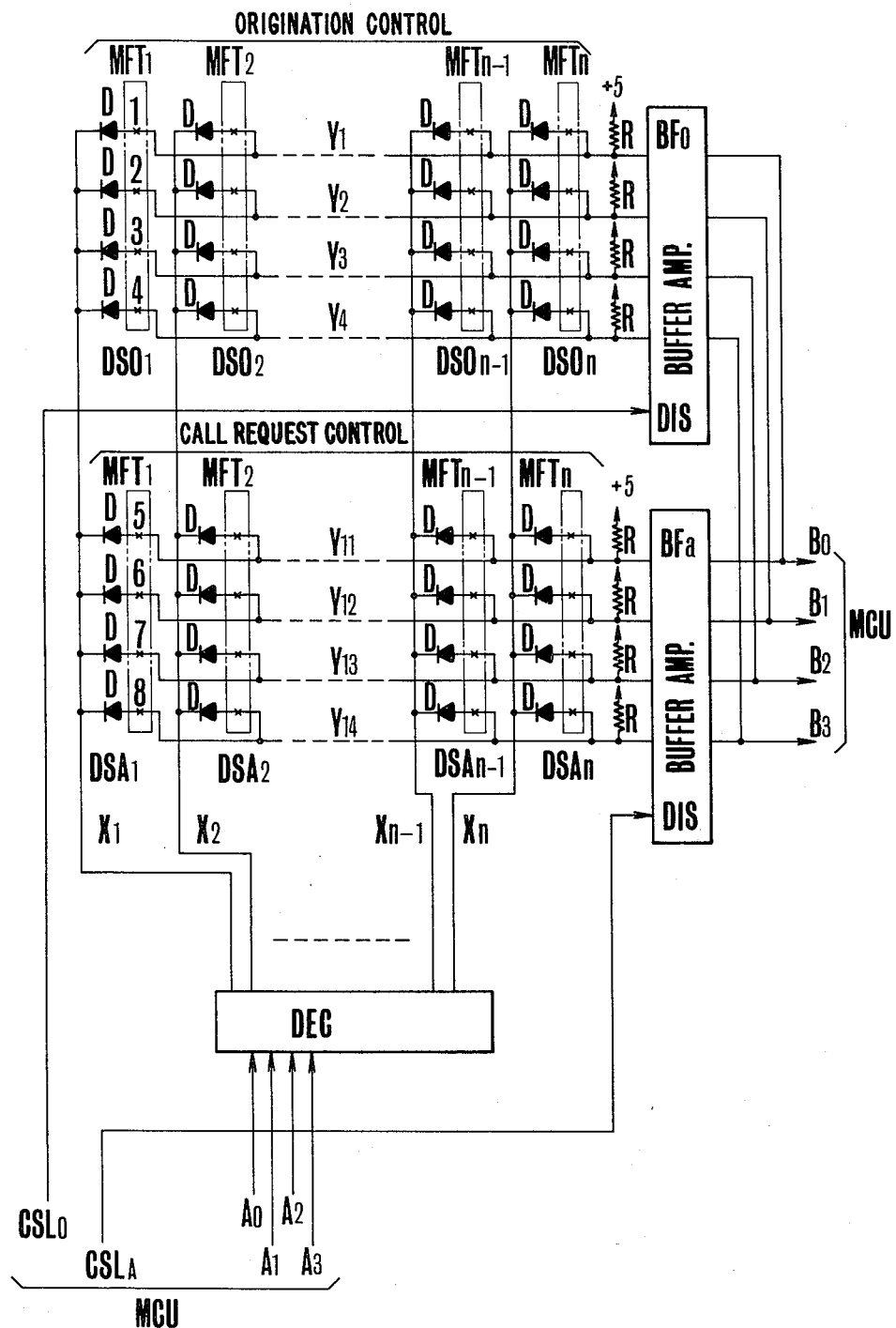
FIG. 17 is a connection diagram showing the detail of the origination and call request control unit shown in FIG. 1.

FIG. 17 is a connection diagram showing the detail of the origination and call request control circuit OAU shown in FIG. 1 in which there are provided four office lines. Bus lines Y1 to Y4 and Y11 to Y14 corresponding to the office lines SL1 to SL4 are provided for controlling the origination and the call request operations. There are also provided bus lines X1 to Xn which cross aforementioned bus lines and correspond to respective telephone sets MFT1 to MFTn. Between cross-points between bus lines Y1 to Y4, Y11 to Y14 and X1 to Xn are interposed series circuits of diode D switches DSO1 to DSOn and diodes DSA1 to DSAm.

A voltage of +5 V is applied to bus lines Y1 to Y4 and Y11 to Y14 through a resistor R to hold them at the high level H and each set of the four bus lines is connected to inputs of integrated buffer amplifiers BF0 and BFa. Telephone designation signals Ao to A3 each in the form of 4 bits are applied to bus lines X1 to Xn from the main control unit MCU via a decoder DEC so that according to the combinations of the high and low levels of the telephone set designation signals Ao to A4, the output of the decoder DEC for one of the bus lines X1 to Xn becomes the low level L.

For this reason, when all switches DSO1 to DSOn and DSA1 to DSAn are OFF, bus lines Y1 to Y4 and Y11 to Y14 are always at the high level H, so that the buffer amplifiers BF0 or BFa are operated by the check signals CSLo and CSLa given by the main control unit MCU according to the check of the origination and call request control unit to send out any one of the outputs Bo to B3 at the high level H to the main control unit MCU. However, when the switch DSO1 to 1 is closed, the voltage of the bus line X1 becomes the low level L via a diode D and the switch DSO1 to 1 whereby the bus line Y1 becomes the low level L and hence the output Bo also becomes the low level L. In response to this low level L, the main control unit MCU judges that the origination from the telephone set MFT1 for the office line SL1, is prohibited since the telephone set designation signal A0 to A3 is now designating the telephone set MFT1 and the check signal CSLo is now being sent out.

The call request is similarly controlled. For example, when the switch DSA1a to 8 is closed, the main control unit MCU designates the telephone set MFT1 and sends out a check signal CSL$_A$ so that the output B3 of the buffer amplifier BFa becomes the low level. This means that the call request from the office line SL4 is not coupled to the telephone set MFT1.

Above described operations are made when switches DSO2 to DSOn and DSA2 to DSAn are closed and origination and call request by any one of the office lines LS1 to LS4 is prevented for any one of the telephone sets MFT1 to MFTn.

As an equivalent, when the bus line voltage is chosen to be negative, the polarity of the diode D is reversed and the high level H is applied by the decoder DEC to perform the equivalent operations. If desired, the buffer amplifier BFa and the decoder DEC may be omitted.

Figure 18:
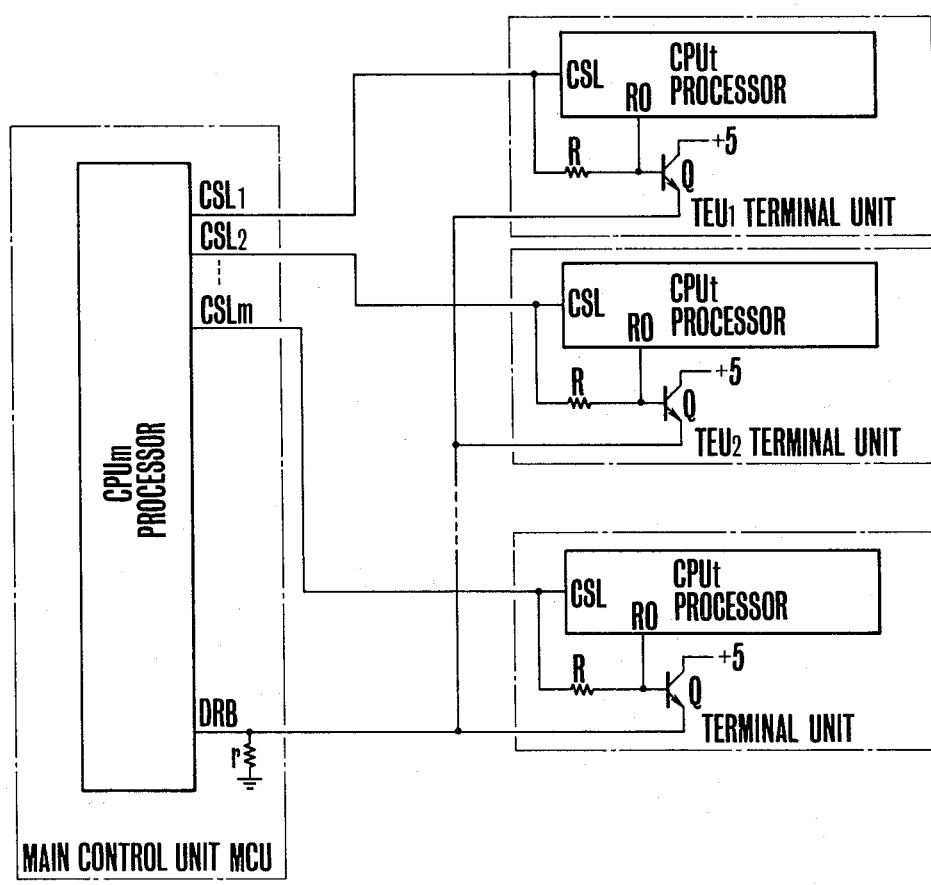
FIG. 18 is a connection diagram showing a response circuit for a polling signal.

FIG. 18 is a connection diagram showing a circuit wherein the terminal units TEU1 to TEUn send out response signals in response to a polling signal from the main control unit MCU. The information checks shown in FIG. 4 are made sequentially as the response signal is received by the main control unit. When any of the terminal units TEU1 to TEUn is in a non-loaded state a response signal would not be sent out so that sequential checking would not be made. To avoid this, the circuit shown in FIG. 14 is constructed such that a quasi response signal would be sent out from a terminal unit in a nonloaded state.

More particularly, the main control unit MCU sequentially sends out polling signals CSL1 to CSLn as high levels H, but since the response signals DRB from the terminal units TEU1 to TEUn are given at low levels L, a sequential switching of the polling signal would be made. Thus, at first when the polling signal CSL1 is given to the terminal unit TEU, this signal turns ON a transistor Q via a resistor R, thus sending out voltage of +5 V.

Then, when the processor CPUt sends out or receives an information signal through another circuit in response to a polling signal, a terminal RO would become low level L. Accordingly, transistor Q is turned OFF, whereby the circuit for the response signal DRB would be grounded through a resistor r on the side of the processor CPUm, thus forcing this side to become the low level.

When the response signal DRB becomes low level L, the processor CPUm confirms this fact to switch the polling signal CSL1. Then the terminal unit TEU2 would operate in the same manner.

In this manner, the polling signal is sequentially switched from CSL1 to CSLn. However, if any one of the terminal units TEU1 to TEUn is in a nonloaded state, the response signal DRB would be always at the low level L so that the processor would judge as if a response signal DRB were given, thus automatically switching the polling signal to the next one. This is also true for any one of the office line units SLU1 to SLUm.

Figure 19:
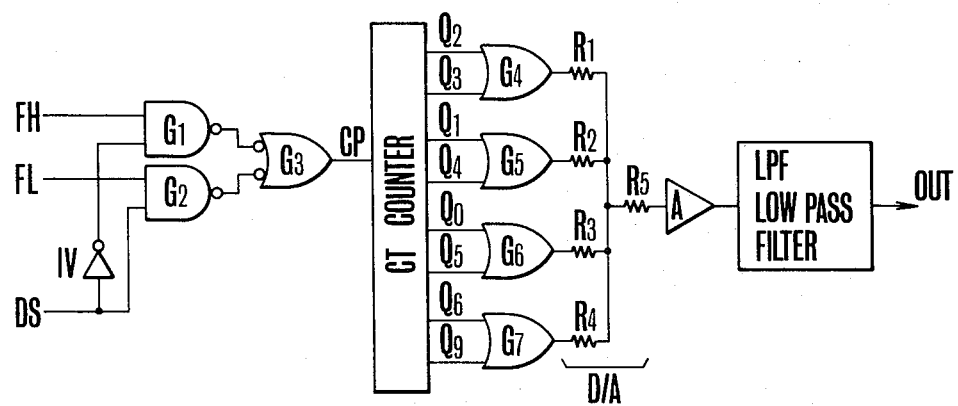
FIG. 19 shows a transmitting circuit of a demodulator utilized in a terminal unit.
Figure 20:
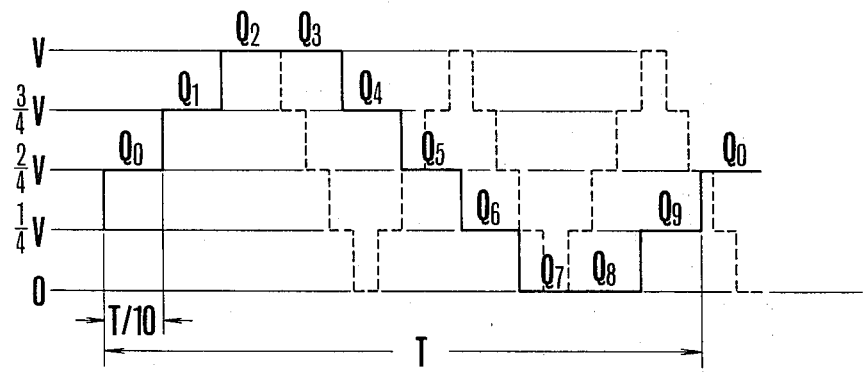
FIG. 20 is a time chart showing the output original waveforms of the circuit shown in FIG. 19.

FIG. 19 shows a transmitting circuit of the MODEM MDM while FIG. 20 is a time chart showing the output waveforms of the circuit shown in FIG. 19.

In the circuit shown in FIG. 19, an original high frequency signal FH and an original low frequency signal FL each having a frequency 10 times that of the high and low frequencies of the signal FS are applied to one input of NAND gate circuits G1 and G2 respectively, and to the other input thereof is applied a data signal DS directly or through an inverter IV. When the data signal DS becomes low level L, the NAND gate circuit G1 becomes enabled to pass the original FH signal through the NAND gate circuit G1 and an input inverting type OR gate circuit G3 to apply it to a binary ring counter CT, whereas when the data signal DS becomes high level H, the NAND gate circuit G2 is enabled to apply the original low frequency signal FL to the counter CT.

Accordingly, the counter CT counts the number of cycles of the FH or FL signal supplied to its clock input CP to sequentially produce outputs Qo and Q9 at a high level H and these outputs, except Q7 and Q8, are applied to a digital/analog converter D/A constituted by resistors R1 to R5 via OR gate circuits G4 to G7. The analog signal thus obtained is amplified by an amplifier A and then supplied to a low pass filter LPF to remove higher harmonic components. The output of the filter LPF is supplied to an output terminal OUT.

By denoting the output voltage of the D/A converter by V when the outputs Q2 and Q3 become the high level, the D/A converter produces output voltages of 3/4 V when the outputs Q1 and Q4 become the high level, 2/4 V when the outputs Q0 and Q5 become the high level H and 1/4 V when the outputs Q6 and Q9 become the high level H. However, when the outputs Q7 and Q8 are at the high level these output voltages are not applied to the D/A converter so that its output is zero.

Consequently, as shown in FIG. 20, in the reset state of the counter CT, since its output Qo is at the high level, the output of the D/A converter becomes 2/4 V. However, when the original low frequency is given, outputs of V, 3/4 V, 2/4 V, 1/4 l V, 0 and are sequentially produced. By repeating this procedure a stepped quasisinusoidal wave can be obtained having a period T ten times the period T/10 of the original low frequency FL. When only the fundamental waveform is derived out from this sinusoidal wave through the low pass filter LDF an FS signal having a frequency of 1/10 of the original low frequency can be obtained.

When the data signal DS is inverted while the original low frequency is being applied, the frequency division of the original high frequency FH is commenced so that a quasisinusoidal wave corresponding to the high frequency of the signal FS can be produced as shown by solid lines which can also be converted into a sine wave through the low pass filter LPF.

Even when the frequency applied to the counter CT varies at an intermediate point, the frequency division is continued always from the immediate frequency dividing state so that there is no fear of transient as an overshooting of the waveform, thereby smoothly shifting the frequency. This prevents an error on the receiving side caused by unwanted frequency components.

Furthermore, it will be clear that the original low and high frequencies may be determined according to the ratio of frequency division of the converter CT, and that D/A converters of other types may be used.

Figure 21:
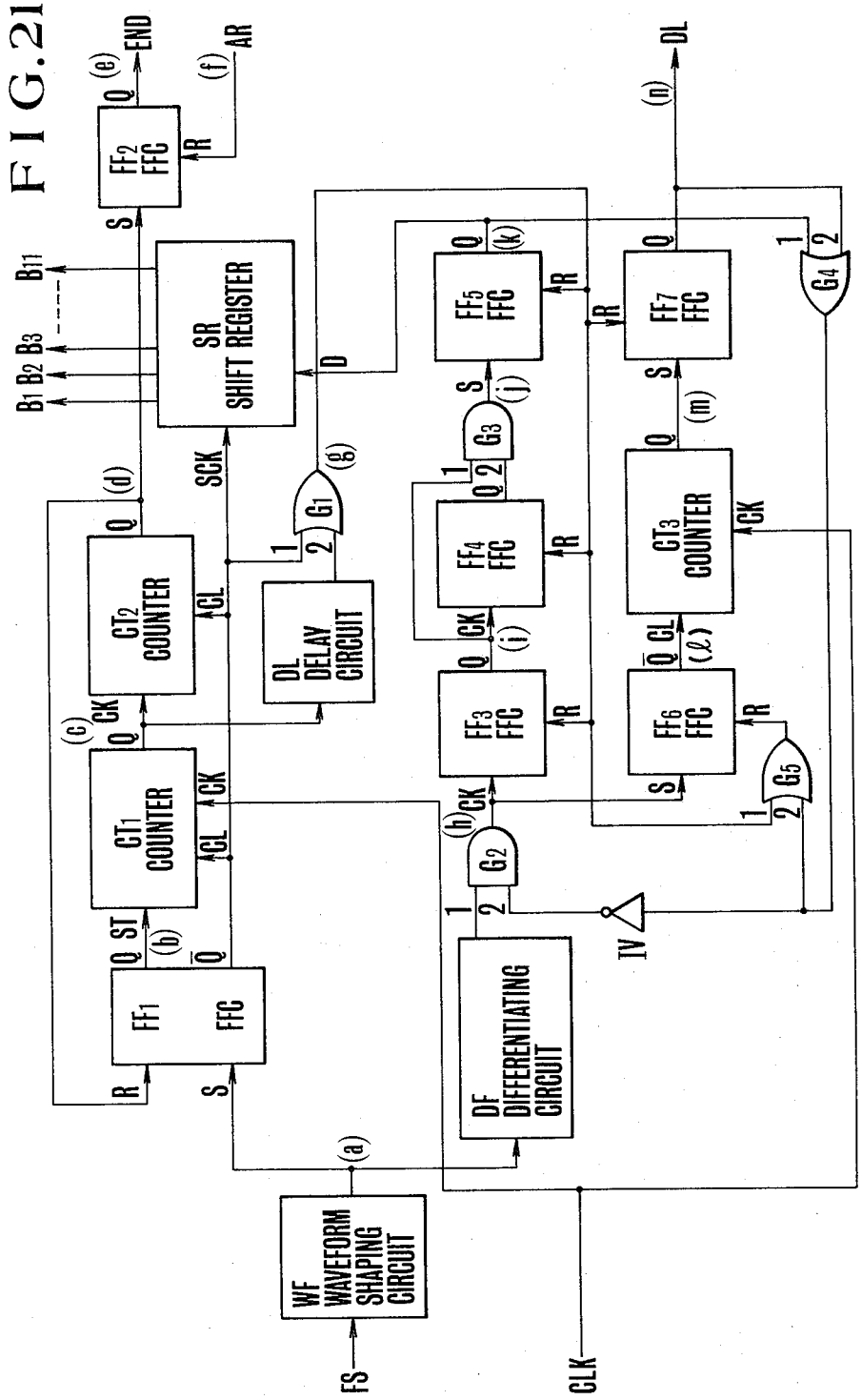
FIG. 21 is a block diagram showing the receiving circuit of a demodulator utilized in each terminal unit.
Figure 22A:
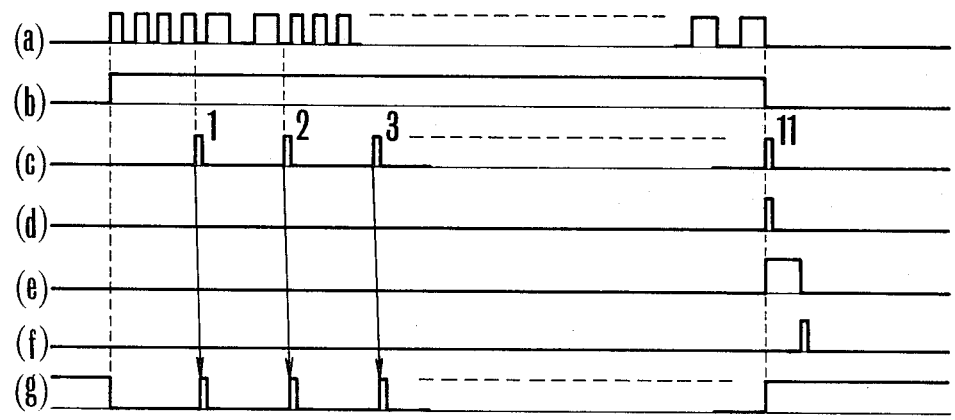
FIG. 22A is a time chart showing the waveforms of various pulses.
Figure 22B:
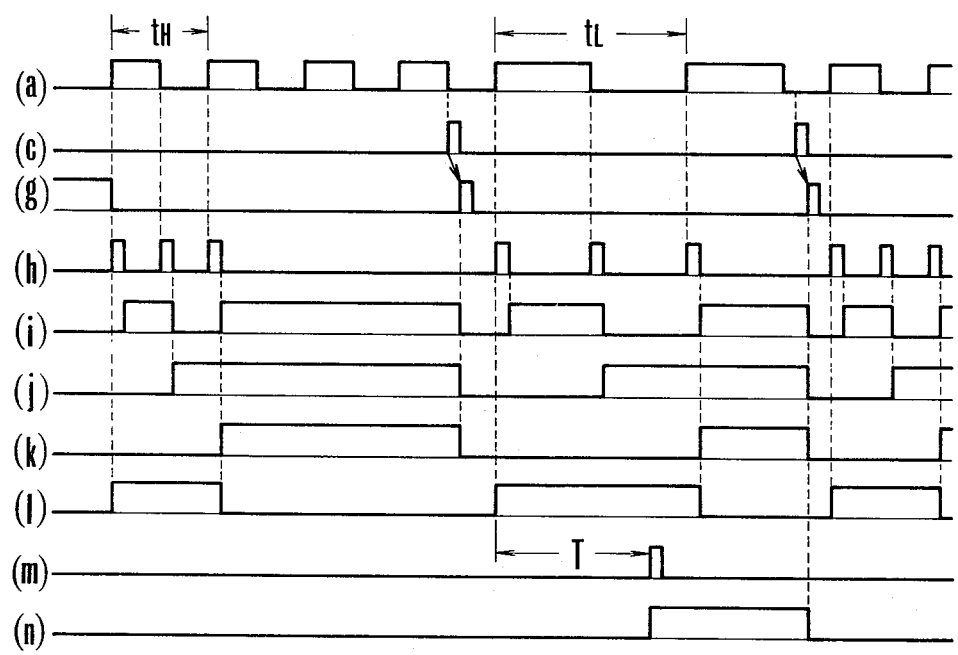
FIG. 22B is an enlarged view of the pulses shown in FIG. 22A.

Similar to FIG. 19, FIG. 21 is a block diagram showing the receiving circuit of a MODEM MDM utilized in each of the terminal units TEU1 to TEUn, while FIGS. 22A and 22B are time charts showing the waveforms at various portions shown in FIG. 19.

Referring now to FIG. 21, the signal FS having a sinusoidal waveform is converted into a pulse wave as shown in FIG. 22A (a) by the waveform shaping circuit WF, and a flip-flop circuit FF1 is set by the rising edge of the pulse wave so that the ouput Q of the flip-flop circuit FF1 becomes the high level as shown in FIG. 22A (b).

In response to the output (b) of the flip-flop circuit FF1, a ring counter CT1 begins to count the number of the clock pulses CLK so as to produce a pulse shown in FIG. 22A (e) each time respective bit periods of the signal FS terminate, and the pulse thus produced is applied to the counter CT2. Then, it counts the number of the pulses (c). Since in this example, one word of the signal FS is constituted by 11 bits, when 11 pulses (c) are counted, an output as shown in FIG. 22A (d) is produced whereby a flip-flop circuit FF2 is set and the flip-flop circuit FF1 is reset.

The output (e) of the flip-flop circuit FF2 is supplied to a processor CPUt acting as a data judging circuit to act as a termination signal END that designates the completion of the reception of signal FS. For the purpose of showing the order of the bits now being received, a shift register SR is shifted by the output of a flip-flop circuit FF5 to be described later to sequentially make its outputs B1 to B11 to become high levels.

When the data judging circuit completes its judging operation of the data in response to the reception of the outputs B1 to B11 of the shift register SR and the terminal signal END, a response reset signal AR shown by FIG. 22A (f) is applied to the flip-flop circuit FF2 to reset the same.

The output (c) of the counter CT1 is applied to one input 2 of an OR gate circuit G1 via a delay circuit DL, while the other input 1 of the OR gate circuit G1 is supplied with the Q output of the flip-flop circuit FF1 so that so long as the flip-flop circuit FF1 is held in the set state the OR gate circuit G1 produces a reset pulse which is slightly delayed from the output (c) as shown in FIG. 22A (g).

The output (a) of the waveform shaping circuit WF is also applied to a differentiating circuit DF and, as shown in FIG. 22B (h) (which is depicted with an enlarged time axis with respect to FIG. 22A), the variation in the output (a) is converted into a differentiated pulse which is applied to the input 1 of an AND gate circuit G2.

Since this AND gate circuit G2 is enabled while a flip-flop circuit FF5 is in its reset state, the differentiated pulse passes through the OR gate circuit G2 to drive a flip-flop circuit FF3 at the falling edge portion of the pulse, thus repeatedly setting and resetting FF3.

A flip-flop circuit FF4 is set by the falling edge portion of the output (i) of the flip-flop circuit FF3. When outputs (i) and (j) simultaneously are high, the output of an AND gate circuit G3 also becomes high whereby the flip-flop circuit FF5 is set. The output of FF5 goes high, which causes the input 2 of the AND gate circuit G2 to go low through an OR gate circuit G4 and an inverter IV, with the result that the AND gate circuit G2 is disabled to block the differentiated pulse from the differentiating circuit DF. Consequently, only 3 differentiated pulses showing an interval corresponding to one cycle of the signal FS are obtained.

The first rising edge portion of the differentiated pulse (h) sets a flip-flop circuit, but since the output (k) of the flip-flop circuit FF5 is applied to a flip-flop circuit FF6 via an OR gate circuit G5, the flip-flop circuit FF6 is reset and the output (l) of the flip-flop circuit FF6 goes high only for an interval corresponding to one cycle of the signal FS.

In response to the output (l) of the flip-flop circuit FF6, a counter CT3 commences to count the number of the clock pulses CLK and is reset when the output (l) becomes the low level L. The count at which an output (m) is produced is set such that the counter stops to count the number of the clock pulses during a period of $T = (t_H + t_L)/2$ or a period T expressed by a relation $t_H < T < t_L$, where $t_H$ and $t_L$ represent the periods of the high frequency $f_H$ and the low frequency $f_L$ of the signal FS, so that an output (m) is produced only for the low frequency $f_L$.

As a consequence, when the signal FS is of the low frequency $f_L$, an output (m) is produced to reset a flip-flop circuit FF7 which is held in this state until reset by a reset pulse (g) so as to send an output (n) to the data judging circuit as the low frequency detection output DL.

Furthermore, since the flip-flop circuits FF3 to FF6 are also reset by the reset pulse (g), the above described operations are repeated at each bit of the signal FS.

Thus, the data judging circuit judges whether the bits are of the high frequency $f_H$ or the low frequency $f_L$ by utilizing the outputs B1 to B11 of the shift register SR, the low frequency detection output DL and the termination signal END, thus decoding the content of the data in one word.

Depending upon the circumstances, however, the receiving circuit may send out only the low frequency detection signal, in which case the shift register SR and the flip-flop circuit FF2 can also be omitted. It is also possible to provide the counter CT3 for both high and low frequencies $f_H$ and $f_L$ for deriving out detected outputs from respective frequencies. The same objects can also be accomplished by controlling the processor according to a predetermined program.

Accordingly, with the receiving circuit shown in FIG. 21 it is possible to positively receive the signal FS without using a frequency discriminator in the form of a large and heavy inductance coil. In addition, since the receiving circuit is constituted by a digital circuit, it is not necessary to adjust it after fabrication so that it is possible to construct it to have a small size and a small weight at a low cost.

Moreover it is possible to add a door phone, a simultaneous call circuit, a conference telephone circuit, etc., to the basic construction shown in FIG. 1. Further, it is possible to make the connections to respective telephone sets MFT1 to MFTn to be two line type (instead of four line type) by multiplexing the voice signals and the data signals.

As above described, the key telephone system of this invention can not only reduce the number of wiring connections but also provide various services. Furthermore, by merely changing the programs of various processors, various operational performances can be readily changed. Thus, it will be clear that the invention is applicable to key telephone systems of various types.

What is claimed is:

1. A key telephone exchange system for enabling connections between office lines and key telephone sets, said system comprising:
   a main control unit provided with a processor;
   a plurality of office line units provided for respective office lines, each office line unit including a processor, means for detecting a call request and means for seizing an office line;
   a plurality of key telephone sets; and
   a plurality of terminal units respectively connected to associated ones of said key telephone sets via voice lines and data lines, each terminal unit including a processor, means for transmitting and receiving data to and from a telephone set, and means for establishing connections;
   the processor of said main control unit including means for checking information signals of said office line units and of said terminal units, and means for controlling said office line units and said terminal units in accordance with the results of said checking for establishing connections between said office lines and said key telephone sets and between said key telephone sets.

2. In a key telephone exchange system of the type comprising office line units connected to office lines, terminal units respectively connected to key telephone sets via voice lines and data lines, and a main control unit for establishing connections between respective office line units and respective terminal units, the improvement wherein each one of said office line units comprises a memory device adapted to store data transmitted between said office line unit and an office line, and a processor for writing and reading data into and out of said memory device for controlling origination and call requests to and from said office line; wherein each one of said terminal units comprises a memory device adapted to store data transmitted between a terminal unit and a telephone set, and a processor for writing and reading data into and out of said terminal unit memory device for controlling transmission of data between a terminal unit and a corresponding telephone set; and wherein said main control unit comprises a memory device for storing states of use of said terminal units and said office line units, and a processor for sequentially scanning data in said memory devices of said terminal units and said office line units and for establishing connections between said terminal units and said office line units according to data obtained as a result of the scanning.

3. A key telephone exchange system according to claim 1 wherein said main control unit comprises means for sequentially checking information signals of said office line units and said terminal units, and an information transmitting system for supplying information signals obtained as a result of said information check to said terminal units, thus causing the same to store the supplied information, thus causing simultaneous transmission and reception of information signals between said terminal units and said key telephone sets.

4. A key telephone exchange system according to claim 3 wherein said information transmitting system is of a frequency shift keying transmitting type.

5. The invention according to claim 2 or 3 wherein each one of said office line units includes means for detecting a call request signal, and an office line relay for seizing an office line and for generating a plurality of dial pulses, said office line relay having a contact connected in series with said office line.

6. The invention according to claim 5 which further includes make/break memory means and wherein said office line relay includes another contact, said make/break memory means storing a make delay time of said another contact at a time of seizing said office line and a break delay time of said another contact at a time of sending a first dial pulse, whereby said make/break memory means corrects make/break instructions of succeeding dial pulses by assuming succeeding make and break times to be constant.

7. The invention according to claim 6 wherein each said office line unit processor includes means for updating the contents of said make/break memory means concerning the make delay time and the break delay time of said office line relay each time a dial pulse is sent out, and means for correcting make and break instructions of succeeding dial pulses in accordance with said updated delay times.

8. The invention according to claim 7 further including a plurality of link circuits coupled to said terminal units, and wherein each one of said terminal units includes a demodulator connected to a data line and cross-point means interconnecting a voice line and either one of said plurality of office lines or one of said plurality of link circuits.

9. The invention according to claim 8 wherein said main control unit includes means for sending out a reset signal to said respective terminal units when said office line units and said terminal units are found to be idle as a result of checking information signals of said office line units and said terminal units.

10. The invention according to claim 2 or 3 wherein said key telephone sets include means for generating an office line selection signal, and wherein said main control unit includes an office line reserving timer for checking the state of an office line selected when an office line selection signal sent from a key telephone set is received, means for starting said office line reserving timer when the selected office line is idle and for storing an office line reserve information signal in an office line state memory means to inhibit the seizing or reservation of said office line by another key telephone set, thus permitting only a corresponding key telephone set to transmit an office line origination signal.

11. The invention according to claim 10 further including means for storing a busy reserving information signal in a busy reserving memory device when the selected office lines is busy or has already been reserved and when other office lines are also busy or have already been reserved, means for storing an office line reserving information signal in an office line state memory device upon opening of an office line and then starting said reserving timer, thereby inhibiting the seizing or reservation of said office line by other key telephone sets during operation of said reserving timer, thus permitting only the key telephone set which generated said office line selection signal to make an office line origination.

12. The invention according to claim 10 further including means for refusing an office line reserve request when a selected office line is busy or has already been reserved.

13. The invention according to claim 9 further including means for refusing an office line reserve request when a selected office line is busy and when other office lines are idle or have not been reserved.

14. The invention according to claim 8 wherein said key telephone sets further include means for generating a local line origination signal, and wherein said system further includes a local line calling timer for checking states of link circuits when a local line origination signal is received from a key telephone set, means for storing the local line origination signal in a local line origination memory device and for starting said local line calling timer when one of the local talking paths is idle, and means for clearing said local line origination memory device when a called party does not respond during operation of said local line calling timer.

15. The invention according to claim 2 or 3 wherein each processor of said office line units or said terminal units includes means for processing a plurality of information signals arranged according to the same order, and means for designating an information signal at a predetermined order among said arranged information signals as a special information signal for each processor according to a predetermined combination of signals supplied to a plurality of control terminals of each processor.

16. The invention according to claim 2 or 3 further including an origination and call request control unit for enabling said main control unit to control connections to said key telephone sets according to an output of said origination and call request control unit.

17. The invention according to claim 16 wherein said origination and call request control unit includes a series circuit including a diode and switch means inserted at respective cross-points between a first plurality of bus lines corresponding to said office lines and a second plurality of bus lines corresponding to said plurality of key telephone sets, input means for receiving an information signal from said main control unit for designating one of said second plurality of bus lines, and output means coupled to said first plurality of bus lines for generating signals indicating the state of said switch means when interrogated by a check signal from said main control unit.

18. The invention according to claim 2 or 3 wherein each one of said terminal units includes a response signal sending circuit having a switching element which is controlled by an instruction signal from said main control unit to send out a signal, and means responsive to said instruction signal from reversing a state of said switching element so as to stop the sending out of said response signal.

19. The invention according to claim 2, 3 or 4 wherein said terminal units further include a frequency shift signal generator connected to the associated data lines for enabling transmission of data signals to the corresponding key telephone set.

20. The invention according to claim 19 wherein said frequency shift signal generator comprises a gate circuit for selectively passing either one of an original high frequency signal or an original low frequency signal each having a frequency which is an integer multiple of high and low frequencies of the frequency shift signal, a counter having a maximum count output corresponding to said integer for counting the number of output signals from said gate circuit, and a digital-to-analog converter for converting an output of said counter into an analog signal.

21. The invention according to claim 2, 3 or 4 wherein said terminal units further include a frequency shift signal demodulator connected to the associated data lines for enabling reception of data signals from the corresponding key telephone set.

22. The invention according to claim 21 wherein said frequency shift signal demodulator comprises a pulse generator for generating a number of clock pulses, a counter for counting a period corresponding to at least one half cycle of a frequency representing respective bits of a frequency shift keying signal in terms of the number of clock pulses having a definite frequency, and a detector for detecting said frequency according to a count of said counter.

23. The invention according to claim 2, 3 or 4 wherein each of said terminal units includes a first line transformer connected to said voice lines and a second line transformer connected to said data lines.

24. The invention according to claim 23 wherein operating power is supplied to said key telephone sets from said terminal units through neutral points of said line transformers.

25. A key telephone exchange system comprising:
a main control unit (MCU) provided with a processor;
a plurality of office line units (SLU1-SLUm) corresponding to a plurality of office lines, each of the office line units being provided with a means (DET) for detecting states of said corresponding office lines, a means (HS, hS1) for seizing said office line, a memory (MS) for storing first information from and to said detecting means (DET) and said seizing means (HS, hS1), and a processor (CPUs) for controlling operations of writing and reading said first information to and from said memory (MS), and for controlling operations of said detecting means (DET) and said seizing means (HS, hS1) without depending on said main control unit processor;

a plurality of terminal units (TEU1-TEUn) corresponding to a plurality of key telephone sets (MFT1-MFTn), each of said terminal units being connected to the corresponding key telephone set through a pair of data lines (DL1-DLn) and provided with a means (MODEM, Td) for transmitting and receiving second information to and from the corresponding key telephone set, a memory (Mt) for storing the second information to and from the corresponding key telephone set, and a processor (CPUt) for controlling operation of writing and reading the second information to and from said memory (Mt) and for controlling operations of said second information transmitting and receiving means without depending on said main control unit processor; and a means for establishing through a pair of voice lines (VL1-VLn) a connection between one of said office lines and one of said key telephone sets in accordance with a control signal from said main control unit processor;

said main control unit processor having means for sequentially analyzing said office line states using portions of the first information stored in said office line unit memories and portions of the second information stored in said terminal unit memories which are transmitted from said key telephone sets.

26. A key telephone exchange system according to claim 25, wherein each said terminal unit processor (CPUt) includes means for determining whether or not the portions of the second information transmitted from the corresponding key telephone set should be stored in the corresponding terminal unit memory (Mt), and means for writing the portions of the second information into said corresponding terminal unit memory (Mt) in response to the operation of said determining means.

27. A key telephone exchange system according to claim 25 wherein said main control unit processor (MCU) further includes a memory (RAM) for storing states of the office lines and key telephone sets in accordance with the analyzing results of said main control unit processor.

28. A key telephone exchange system according to claim 25 wherein each of said seizing means comprises an office line relay for seizing the corresponding office line and for generating a plurality of dial pulses, said office line relay having a contact connected in series with the corresponding office line.

* * * * *